US011256122B2

(12) United States Patent
Lin et al.

(10) Patent No.: US 11,256,122 B2
(45) Date of Patent: Feb. 22, 2022

(54) IMAGE CAPTURE APPARATUS, ELECTRONIC APPARATUS, AND IN-CELL DISPLAY APPARATUS

(71) Applicant: GINGY TECHNOLOGY INC., Hsinchu (TW)

(72) Inventors: Hao-Xiang Lin, Hsinchu (TW); Jen-Chieh Wu, Hsinchu (TW); Kuo-Wen Yang, Hsinchu (TW); Chih-Chiang Yu, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 0 days.

(21) Appl. No.: 16/892,703

(22) Filed: Jun. 4, 2020

(65) Prior Publication Data
US 2020/0301187 A1    Sep. 24, 2020

Related U.S. Application Data

(63) Continuation-in-part of application No. 16/689,099, filed on Nov. 20, 2019, now Pat. No. 10,726,240, and a continuation-in-part of application No. 16/571,207, filed on Sep. 16, 2019, application No. 16/892,703, which is a continuation-in-part of application No. 16/008,056, filed on Jun. 14, 2018, now Pat. No. 10,735,634.

(60) Provisional application No. 62/867,213, filed on Jun. 26, 2019, provisional application No. 63/003,929, filed on Apr. 2, 2020.

(51) Int. Cl.
*G02F 1/1333* (2006.01)
*G02B 5/00* (2006.01)
*G02F 1/1335* (2006.01)
*G06K 9/00* (2006.01)

(52) U.S. Cl.
CPC ........ *G02F 1/13338* (2013.01); *G02B 5/003* (2013.01); *G02B 5/008* (2013.01); *G02F 1/133514* (2013.01); *G06K 9/0004* (2013.01); *G06K 9/0012* (2013.01)

(58) Field of Classification Search
CPC ............. H04N 5/2254; G06K 9/00013; G06K 9/00046; G02B 5/22; G02B 5/223; G02B 5/226; G02B 5/26; G02B 5/265
See application file for complete search history.

(56) References Cited

U.S. PATENT DOCUMENTS

| 10,735,634 | B2 * | 8/2020 | Chung | ..................... G02B 5/22 |
| 2018/0157889 | A1 * | 6/2018 | MacDonald | ......... G06K 9/0008 |
| 2019/0034020 | A1 * | 1/2019 | He | ..................... G06K 9/00033 |

* cited by examiner

*Primary Examiner* — Daniel M Pasiewicz
(74) *Attorney, Agent, or Firm* — Rosenberg, Klein & Lee

(57) ABSTRACT

An image capture apparatus is illustrated, which has an image capture element and an optical component layer. The image capture element has a plurality of pixel regions. The optical component layer comprises a microstructure layer and a spatial filter formed on the image capture element in a first direction. The microstructure layer has micro lenses formed on a surface of the microstructure layer. The spatial filter has at least one translucent substrate and at least one light shielding structure, and the light shielding structure has a light absorbing/reflective layer and a reflective layer in the first direction stacked to each other. The light absorbing/reflective layer is another one light reflective layer or a light absorbing layer.

22 Claims, 33 Drawing Sheets

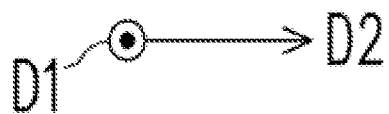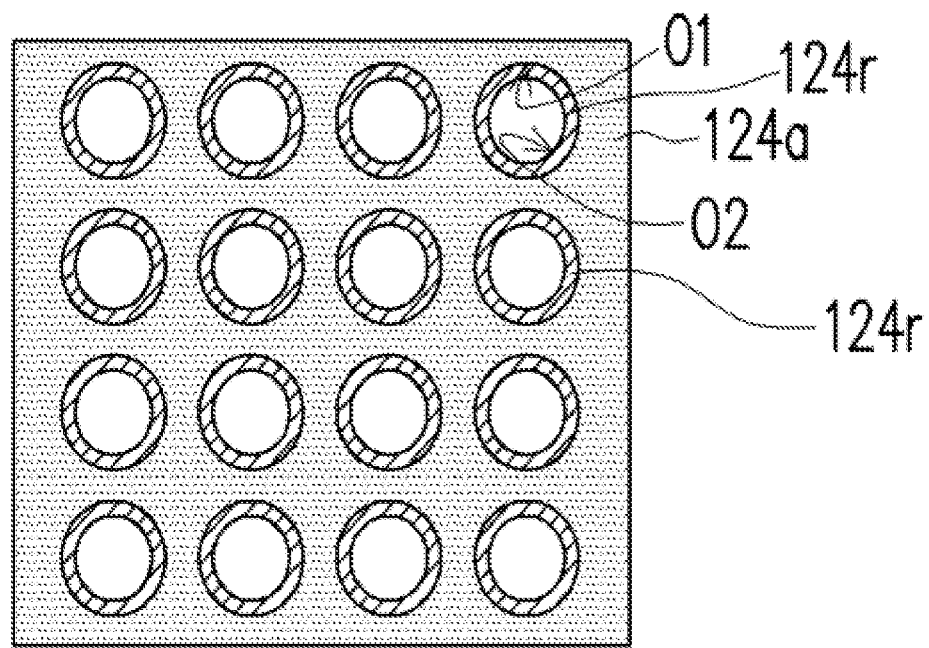
FIG. 2

IMAGE CAPTURE APPARATUS, ELECTRONIC APPARATUS, AND IN-CELL DISPLAY APPARATUS

REFERENCE TO RELATED APPLICATIONS

This non-provisional application is a continuation-in-part (CIP) application of and claims the priority benefit of U.S. application Ser. No. 16/008,056 filed on Jun. 14, 2018, U.S. application Ser. No. 16/689,099 filed on Nov. 20, 2019 and U.S. application Ser. No. 16/571,207 filed on Sep. 16, 2019. This application also claims the priority benefits of U.S. provisional Application No. 63/003,929, filed on Apr. 2, 2020 and U.S. provisional Application No. 62/867,213, filed on Jun. 26, 2019. The entirety of each of the above-mentioned patent applications is hereby incorporated by reference herein and made a part of this specification.

TECHNICAL FIELD

The present disclosure relates to an optical apparatus, and particularly relates to an image capture apparatus capable of capturing a biometrics image, and an electronic apparatus and an in-cell display apparatus using the image capture apparatus.

RELATED ART

Currently, an optical fingerprint identification apparatus achieves fingerprint image capturing based on the principle of total reflection. The operating principle thereof is as follows: when a finger presses a fingerprint identification apparatus, the convex portion of the fingerprint destroys the total reflection of a light beam in the light transmitting element, and the concave portion of the fingerprint does not destroy the total reflection of the light beam in the light transmitting element. Consequently, the image capture element may obtain the bright stripes of the concave portion of the fingerprint and the dark stripes of the convex portion of the fingerprint. In this way, each pixel region on the image capture element may capture the stripe patterns corresponding to each area of the fingerprint so as to identify the user's identity.

To improve the accuracy of the image capture apparatus, it is necessary to further improve the filtering capabilities of the spatial filter on the image capture apparatus. However, the spatial filter based on current prior art techniques still has a lot of defects in terms of filtering capabilities. For example, it is not easy to make the light beam reflected by the fingerprint enter the corresponding pixel region accurately. As a result, image capturing capabilities of the image capture apparatus cannot be improved, causing problems such as a decrease in fingerprint identification capabilities.

Further, the image capture apparatus may be integrated into a display apparatus with or without a touch control function. The image capture apparatus is adhered or formed on one layer of the display apparatus, thus forming an on-cell display apparatus which thickness is still large.

SUMMARY

The present disclosure provides an image capture apparatus of good image capturing quality, and an electronic apparatus and an in-cell display apparatus using the image capture apparatus. Further, the image capture apparatus can be also formed with a surface plasma resonance layer formed on the cover plate, so as to have a function of detecting biopolymers.

An embodiment of the present disclosure provides an image capture apparatus, comprising an optical component layer and an image capture element having a plurality of pixel regions. The optical component layer comprises a microstructure layer and a spatial filter formed on the image capture element in a first direction, wherein the microstructure layer has a plurality of micro lenses formed on a surface of the microstructure layer. The spatial filter comprises at least one translucent substrate and at least one light shielding structure, the light shielding structures is formed in the translucent substrate, wherein the light shielding structure comprises a light absorbing/reflective layer and a reflective layer in the first direction stacked to each other. The light absorbing/reflective layer has a plurality of first openings in a second direction perpendicular to the first direction, the reflective layer has a plurality of second openings in the second direction, each of the first openings is corresponding to one of the pixel regions, and one of the second openings and one of the micro lenses in the first direction, wherein the light absorbing/reflective layer is another one light reflective layer or a light absorbing layer.

In one embodiment of the present disclosure, a distance HC between the reflective layer and the light absorbing/reflective layer in the first direction satisfies "$HC \leq \pi((WM/2)^2+H^2)/2H$", WM is a width or diameter of the micro lens in the second direction, H is a thickness of the micro lens MR in the first direction, and HC is larger than or equal to 0.

Embodiments of the present disclosure also provide an electronic apparatus and an in-cell display apparatus using the same.

Based on the foregoing, in the image capture apparatus according to an embodiment of the present disclosure, since the light shielding structure has the reflective layer and the light absorbing layer stacked to each other (or two stacked the high reflective layers or two stacked the light absorbing layers), when the light beam is reflected by the finger and proceeds toward the plurality of openings, the light beam may be more accurately restricted to be transmitted to the corresponding pixel region on the image capture element so as to achieve good image capturing quality. Besides, due to the configuration of the light shielding structure after being reflected by the reflective layer, thereby greatly reducing the possibility that the light beam may be transmitted to the adjacent opening. Consequently, the cross-talk problem between each pixel region is reduced, and the accuracy of the image capture apparatus is improved. Further, in the present disclosure, an in-cell display apparatus using the image capture apparatus is provided, which TFT layer can have the image capture apparatus as mentioned above, so as to have a thickness thinner than that of the conventional on-cell display apparatus.

To make the aforementioned and other features and advantages of the present disclosure more comprehensible, several embodiments accompanied with drawings are described in detail as follows.

BRIEF DESCRIPTION OF THE DRAWINGS

The structure as well as preferred modes of use, further objects, and advantages of this present disclosure will be best understood by referring to the following detailed description of some illustrative embodiments in conjunction with the accompanying drawings, in which:

FIG. 2 is a schematic top view of a light shielding structure of an image capture apparatus according to an embodiment of the present disclosure.

DETAILED DESCRIPTION OF THE ILLUSTRATIVE EMBODIMENTS

Figure 1:
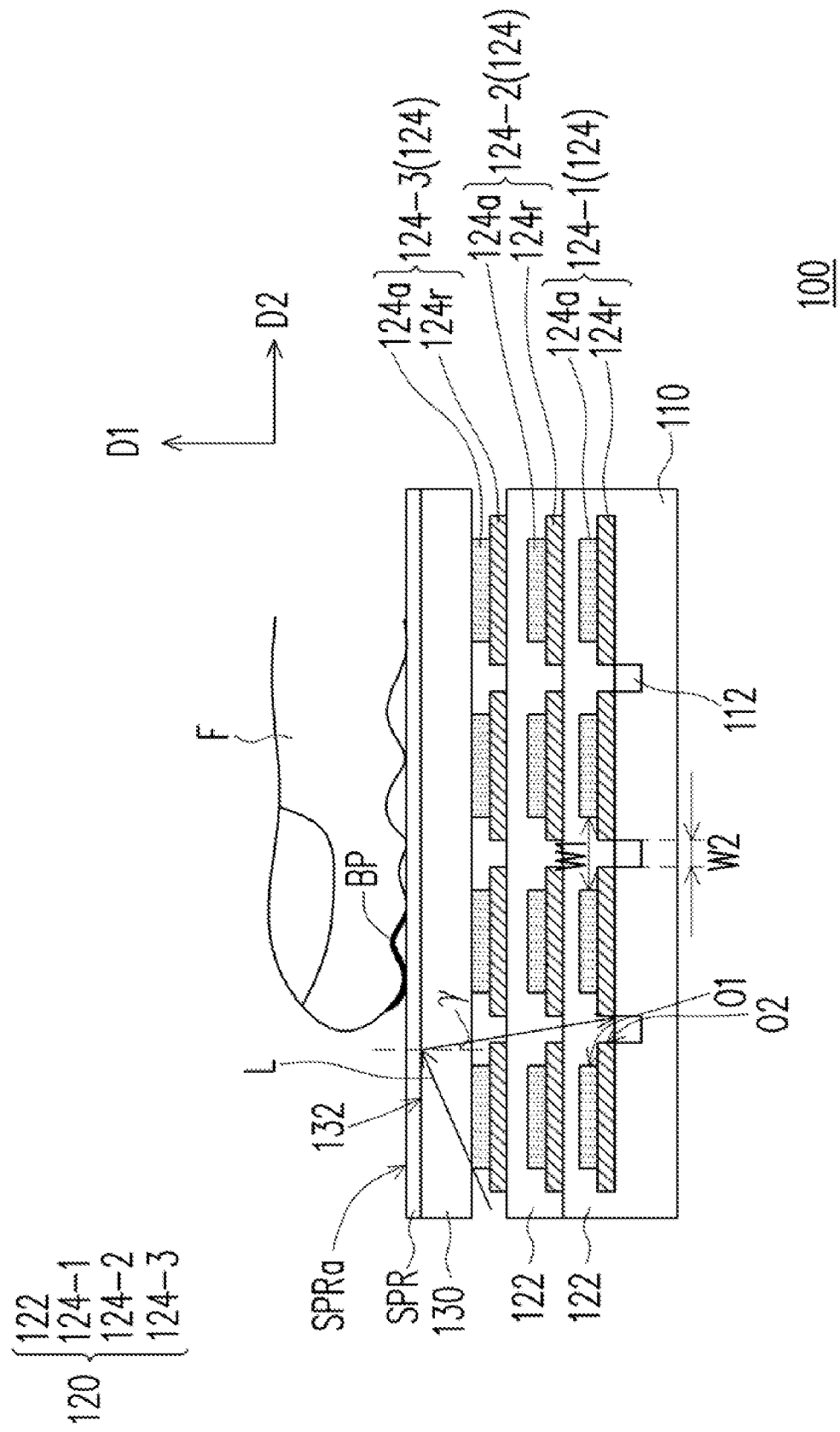
FIG. 1 is a schematic cross-sectional view of an image capture apparatus according to an embodiment of the present disclosure.

Descriptions of the present disclosure are given with reference to the exemplary embodiments illustrated by the drawings. Wherever possible, the same reference numerals are used in the drawings and the description to refer to the same or similar parts.

FIG. 1 is a schematic cross-sectional view of an image capture apparatus according to an embodiment of the present disclosure. With reference to FIG. 1, an image capture apparatus 100 includes an image capture element 110 and an optical component layer formed on the image capture element 110, and in the embodiment, the optical component layer is the spatial filter 120. The image capture element 110 has a plurality of pixel regions 112. In this embodiment, the image capture element 110 may be a photoelectric transducer, such as a charge-coupled device (CCD) or a complementary metal-oxide-semiconductor (CMOS) sensor. However, the present disclosure is not limited thereto.

The spatial filter 120 is disposed on the image capture element 110. The spatial filter 120 includes a plurality of translucent substrates 122 and a plurality of light shielding structures 124. The plurality of light shielding structures 124 and the plurality of translucent substrates 122 are alternately arranged along a first direction D1. For example, in this embodiment, the translucent substrate 122 may be a transparent substrate, e.g., a glass substrate, a plastic substrate, or a combination thereof. However, the present disclosure is not limited thereto. In other embodiments, the translucent substrate 122 may also be a light transmitting film with or without wavelength filtering.

FIG. 2 is a schematic top view of a light shielding structure of an image capture apparatus according to an embodiment of the present disclosure. With reference to FIG. 1 and FIG. 2, each of the light shielding structures 124 at least includes a light absorbing layer 124a, and the light absorbing layer 124a has a plurality of first openings O1 respectively corresponding to the plurality of pixel regions 112. At least one light shielding structure 124 of the plurality of light shielding structures 124 includes a reflective layer 124r and a light absorbing layer 124a stacked to each other. For example, in this embodiment, a plurality of light shielding structures 124-1, 124-2 and 124-3 are sequentially disposed along a direction away from the image capture element 110 (e.g., the first direction D1). Each of the light shielding structures 124-1, 124-2 and 124-3 may have the reflective layer 124r and the light absorbing layer 124a. However, the present disclosure is not limited thereto. In this embodiment, a material of the reflective layer 124r may be a metal material or other materials with high reflectivity or a combination thereof, and a material of the light absorbing layer 124a may be a light absorbing material with low reflectivity, e.g., dark ink or other suitable materials.

The reflective layer 124r of the at least one light shielding structure 124 has a plurality of second openings O2 respectively corresponding to the plurality of pixel regions 112, and the light absorbing layer 124a of the at least one light shielding structure 124 has a plurality of first openings O1 respectively overlapped with the plurality of second openings O2. The second opening O2 of the reflective layer 124r has a width W2 in a second direction D2, the first opening O1 of the light absorbing layer 124a has a width W1 in the second direction D2, and W2<W1. For example, 0.2W1≤W2≤0.8W1. However, the present disclosure is not limited thereto.

In this embodiment, the plurality of first openings O1 and the plurality of second openings O2 of the plurality of light shielding structures 124 form a plurality of light channels, and an extending direction of the plurality of light channels may be parallel to a normal direction (e.g., the first direction D1) of a pressing surface 132 of a cover plate 130. However, the present disclosure is not limited thereto. In other embodiments, the plurality of light channels of the plurality of light shielding structures 124 may also extend in an oblique direction, and reference may be made to recitations of the TW Patent Application No. 107202731. In addition, in this embodiment, the widths W2 of the plurality of second openings O2 of the plurality of light shielding structures 124 are consistent. However, the present disclosure is not limited thereto. In other embodiments, the widths W2 of the plurality of second openings O2 of the plurality of reflective layers 124r of the plurality of light shielding structures 124 corresponding to the same pixel region 112 may also decrease or increase progressively away from the image capture element 110, and reference may be made to recitations of the TW Patent Application No. 106142487.

A reflective material layer (not shown) may be patterned to form the reflective layer 124r having the plurality of second openings O2. A light absorbing material layer (not shown) may be patterned to form the light absorbing layer 124a having the plurality of second openings O2. The following is worth noting here: generally speaking, due to characteristics of the reflective material, it is easy to form the second opening O2 having a small width and/or a high distribution density in the reflective material layer; due to characteristics of the light absorbing material, it is not easy to form the first opening O1 having a small width and/or high distribution density in the light absorbing material layer compared to the case of the reflective material layer. In this embodiment, since the at least one light shielding structure 124 of the spatial filter 120 includes the reflective layer 124r, and since the reflective layer 124r has the second opening O2 having a small width W2 and/or a high distribution density, the light channel of the spatial filter 120 has a small minimum width (e.g., W2) and/or a high distribution density. As a result, the spatial filter 120 has a good spatial filtering capability, thereby improving the image capturing resolution of the image capture apparatus 100.

Figure 3:
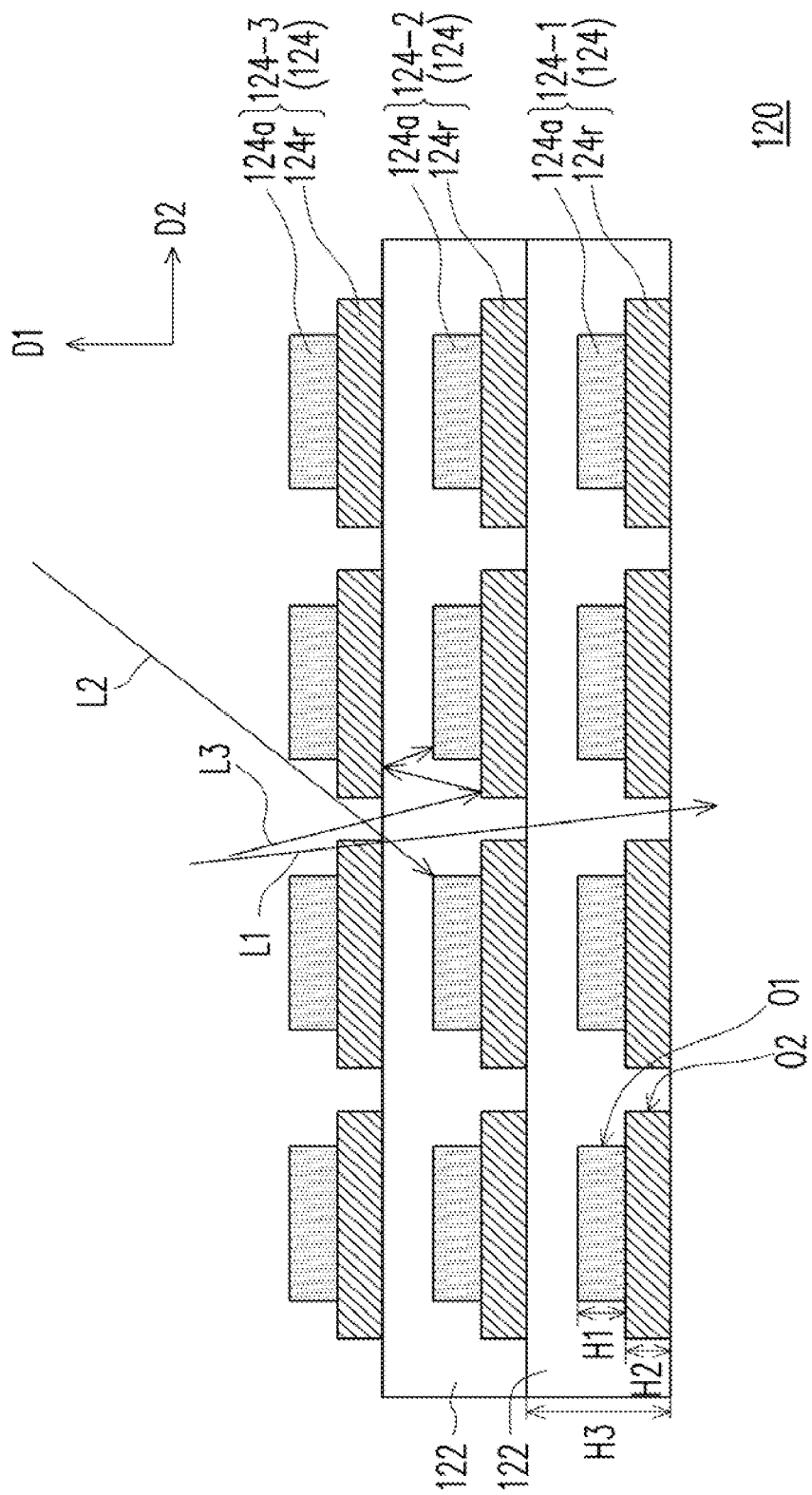
FIG. 3 is an enlarged schematic view of the spatial filter 120 in the image capture apparatus 100 of FIG. 1.

FIG. 3 is an enlarged schematic view of the spatial filter 120 in the image capture apparatus 100 of FIG. 1. With reference to FIG. 1 and FIG. 3, light beams L1, L2 and L3 diffused by a portion of a biometric feature (e.g., a fingerprint of a finger F) are transmitted to the spatial filter 120 at various incident angles. The light beam L1 may pass through the light channel of the spatial filter 120 to be transmitted to the pixel region 112 corresponding thereto of the image capture element 120 so as to form a clear biometric image. The light beam L2 may be directly transmitted to the light absorbing layer 124a of the spatial filter 120 to be absorbed by the light absorbing layer 124a. The light beam L2 would not easily stray into the pixel region 112 not corresponding thereto to cause a cross-talk problem. Although the light beam L3 is reflected by the reflective layer 124r of the light shielding structure 124-2 toward the reflective layer 124r of another light shielding structure 124-3, the light beam L3, after being reflected by the reflective layer 124r of the light shielding structure 124-3, is then absorbed by the light absorbing layer 124a of the light shielding structure 124-2. The light beam L3 would not easily stray into the pixel region 112 not corresponding thereto to cause a cross-talk problem. Therefore, by using the at least one light shielding structure 124 that has the reflective layer 124r and the light absorbing layer 124a, the spatial filter 120 not only may improve the image capturing resolution of the image capture apparatus 100, but does not easily cause a cross-talk problem.

In this embodiment, the sum of a thickness H1 of the light absorbing layer 124a and a thickness H2 of the reflective layer 124r is less than a thickness H3 of the translucent substrate 122. For example, with reference to FIG. 3, the sum of the thickness H1 of the light absorbing layer 124a of the light shielding structure 124-1 and the thickness H2 of the reflective layer 124r of the light shielding structure 124-1 is less than the thickness H3 of the translucent substrate 122 covering the light absorbing layer 124a and the reflective layer 124r of the light shielding structure 124-1. The thickness relationship of the light shielding structures 124-2 and 124-3 with the translucent substrate 122 may be deduced by analogy, and detailed descriptions are not repeated hereinafter.

With reference to FIG. 1, in this embodiment, the image capture apparatus 100 may further selectively include the cover plate 130 that has the pressing surface 132 to be pressed by the finger F, wherein the spatial filter 120 is located between the cover plate 130 and the image capture element 110.

With reference to FIG. 1, in this embodiment, the image capture apparatus 100 may further selectively include a surface plasma resonance layer SPR, wherein the spatial filter 120 is located between the surface plasma resonance layer SPR and the image capture element 110. For example, in this embodiment, the surface plasma resonance layer SPR may be disposed on the pressing surface 132 of the cover plate 130. However, the present disclosure is not limited thereto. The surface plasma resonance layer SPR is adapted to receive biopolymers BP. The biopolymers BP may be sweat, saliva, blood, urine, bacteria, viruses, or other biopolymers to be tested. In this embodiment, the image capture apparatus 100 provided with the surface plasma resonance layer SPR may also be referred to as a detection apparatus. The detection apparatus may have the dual function of sensing fingerprint features on the finger F and detecting biometric features of the biopolymers BP simultaneously, and that is, the provided image capture apparatus 100 has a function of detecting biopolymers BP.

When a light beam L is transmitted to the surface plasma resonance layer SPR, total internal reflection (TIR) of the light beam L occurs on a surface SPRa of the surface plasma resonance layer SPR, and an evanescent wave is formed in an optically thinner medium (such as an environmental medium) and a surface plasma wave is formed in an optically denser medium (such as the surface plasma resonance layer SPR). At this point, the encounter between the evanescent wave and the surface plasma wave results in resonance. When the resonance occurs between the evanescent wave and the surface plasma wave, most of the energy of the light beam L incident on the surface plasma resonance layer SPR is absorbed by the surface plasma wave. As a result, the intensity of the light beam L reflected by the surface plasma resonance layer SPR and having a specific reflection angle is greatly reduced, and here the specific reflection angle is referred to as a resonant angle $\gamma$. In this embodiment, the resonant angle $\gamma$ is related to the refractive index variation of the surface SPRa of the surface plasma resonance layer SPR, that is, the resonant angle $\gamma$ is related to the properties (such as the dielectric constant) of the biopolymers BP attached to the surface SPRa of the surface plasma resonance layer SPR. By analyzing the distribution of the reflected light beam L formed on the image capture element 110, it is possible to infer the resonant angle $\gamma$ so as to further infer what type of the biopolymers BP is attached to the surface SPRa of the surface plasma resonance layer SPR and whether it is the type of the biopolymers to be detected. In addition, in this embodiment, the surface SPRa of the surface plasma resonance layer SPR may selectively be a surface modification layer, so that the biopolymers BP may be attached onto the surface plasma resonance layer SPR more easily, thereby improving detection sensitivity. By the configuration of the surface plasma resonance layer SPR, the image capture apparatus 100 serves multiple functions, not only having the biometric function but also having the function of detecting the biopolymers BP.

Furthermore, though the light structure 124 is formed by the light absorbing layer 124a and the reflective layer 124r, and the present disclosure is not limited thereto. In other embodiments, the light absorbing layer 124a can be replaced with a light shielding material layer which is able to prevent the light beam from propagating through the light shielding material layer. For example, the light shielding material layer is a high reflective material layer, and that is, the present disclosure does not limit the light shielding material layer to be the light absorbing layer 124a. The light shielding material layer can be made of black photoresist, black printed ink, black resin or other light shielding material. Moreover, preferably, the widths W1 and W2 can be 2-30 and the present disclosure is not limited thereto.

Figure 4:
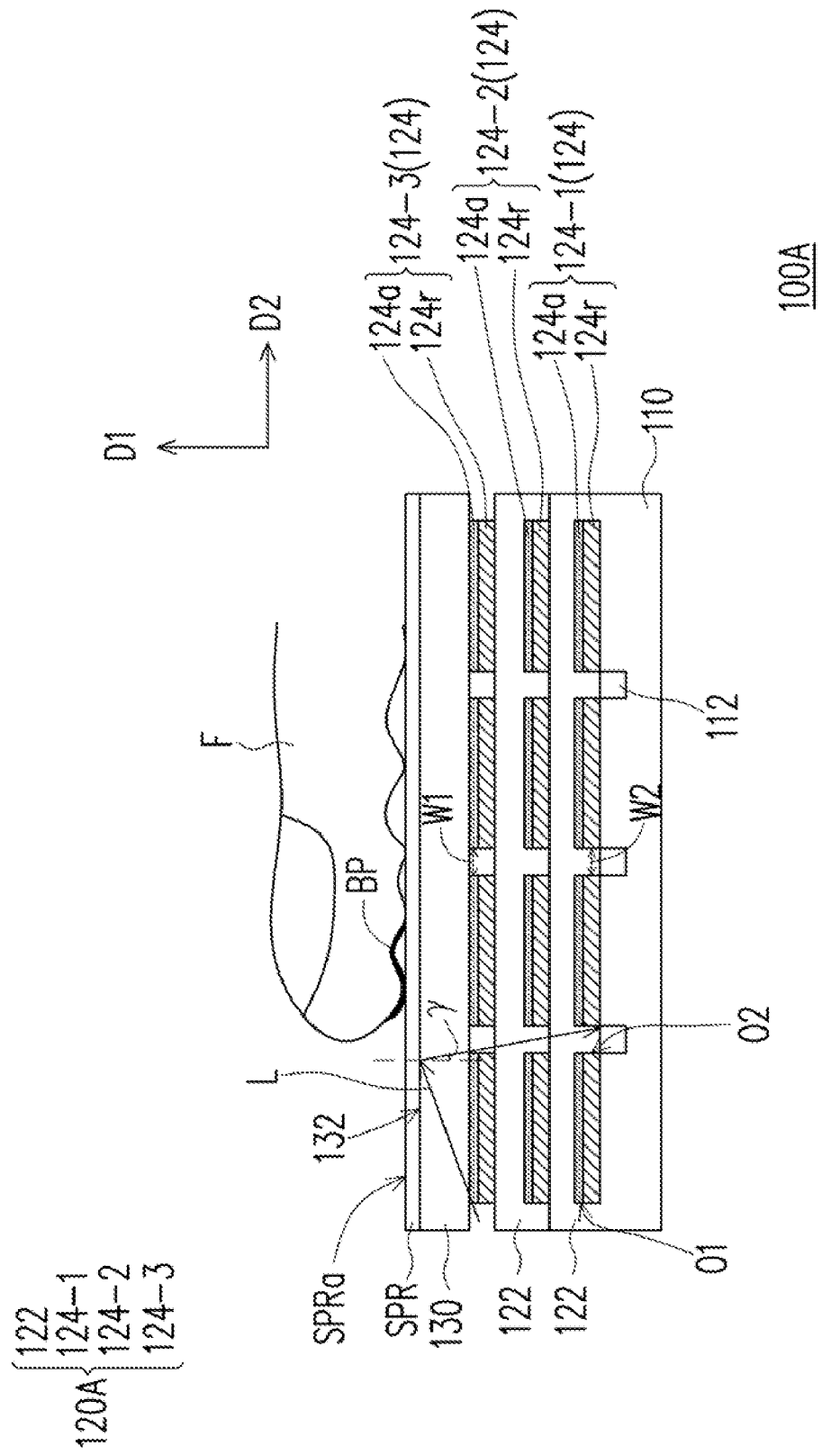
FIG. 4 is a schematic cross-sectional view of an image capture apparatus according to another embodiment of the present disclosure.

FIG. 4 is a schematic cross-sectional view of an image capture apparatus according to another embodiment of the present disclosure. An image capture apparatus 100A of FIG. 4 is similar to the image capture apparatus 100 of FIG. 1, and similar components are not repeated hereinafter. A difference between the two lies in that the width W1 of each first opening O1 is the same as the width W2 of each second opening O2 in a spatial filter 120A of FIG. 4. In this embodiment, for example, the light absorbing layer 124a may be an opaque material, such as graphite or other light absorbing materials. In this embodiment, the light absorbing layer 124a may be formed on a surface of the reflective layer 124r by a coating process, and the light absorbing layer 124a is disposed on the reflective layer 124r in the form of a thin film. However, the present disclosure is not limited thereto.

Figure 5:
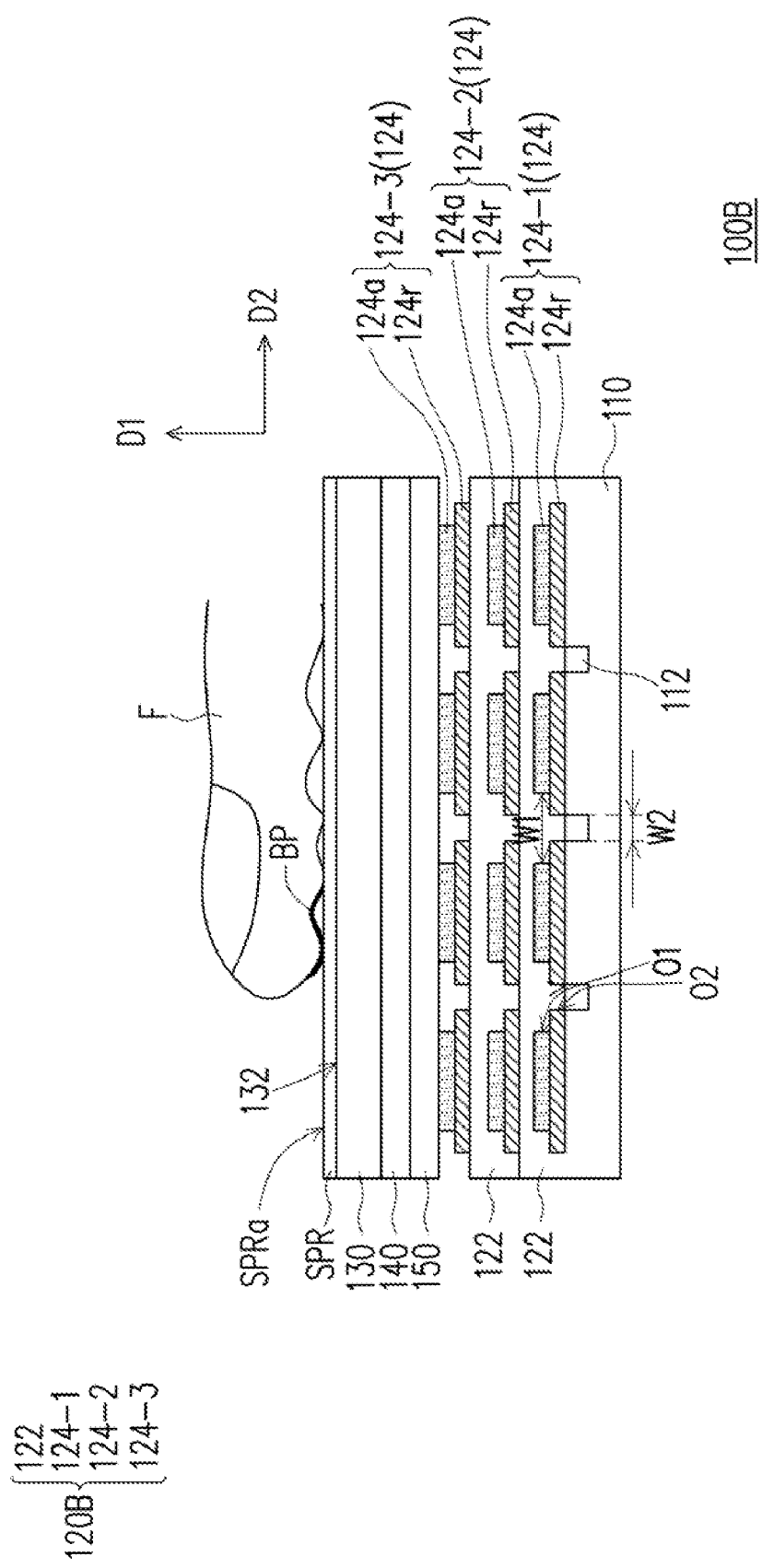
FIG. 5 is a schematic cross-sectional view of an image capture apparatus according to yet another embodiment of the present disclosure.

FIG. 5 is a schematic cross-sectional view of an image capture apparatus according to yet another embodiment of the present disclosure. An image capture apparatus 100B of FIG. 5 is similar to the image capture apparatus 100 of FIG. 1, and a spatial filter 120B is similar to the spatial filter 120 of FIG. 1, and similar components are not repeated hereinafter. In this embodiment, the image capture apparatus 100B may further selectively include a display panel 140, wherein the spatial filter 120B is located between the display panel 140 and the image capture element 110. In this embodiment, the display panel 140 may selectively serve as a light source for illuminating the finger F. However, the present disclosure is not limited thereto. For example, the display panel 140 may be an organic light-emitting diode (OLED) display apparatus, a liquid crystal display (LCD) apparatus or other types of display apparatus. In a feasible embodiment, the light source of the display panel 140 may serve as a light source for the image capture apparatus 100B. In this embodiment, the image capture apparatus 100B may further selectively include a filter layer 150 located on the image capture element 110. In this embodiment, the filter layer 150 is located between a cover plate 130 and the image capture element 110, for example. However, the present disclosure is not limited thereto. The filter layer 150 is adapted to filter out an ambient light with a wavelength outside the wavelength range of the light beam L. For example, if the light beam L is an infrared light beam, the filter layer may be an IR pass filter. If the light beam L is a visible light beam, the filter layer may be an IR cut filter. However, the present disclosure is not limited thereto. According to other embodiments, the filter layer may also be other types of filter layers.

Furthermore, the stack structure of the embodiment of FIG. 5 is not used to limit the present disclosure, the filter layer 150 can be removed, and the spatial filter 120 and the image capture element 110 can be integrated into the display panel 140, such as partial or all of the spatial filter 120 and the image capture element 110 in a thin film transistor (TFT) layer of the display panel 140 being a LCD display apparatus, therefore forming an in-cell display apparatus.

Figure 6:
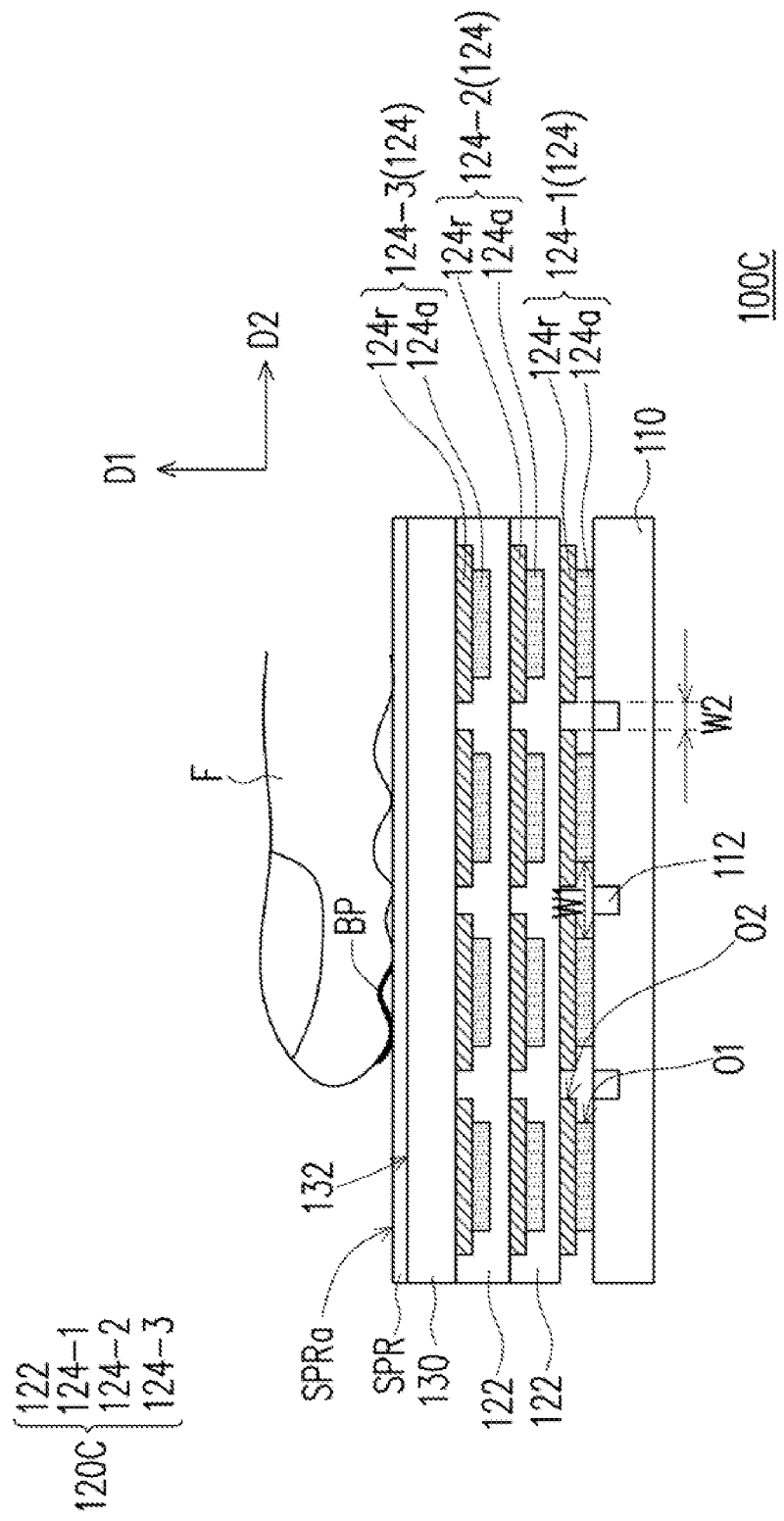
FIG. 6 is a schematic cross-sectional view of an image capture apparatus according to yet another embodiment of the present disclosure.

FIG. 6 is a schematic cross-sectional view of an image capture apparatus according to yet another embodiment of the present disclosure. An image capture apparatus 100C of FIG. 6 is similar to the image capture apparatus 100 of FIG.

1, and similar components are not repeated hereinafter. A difference between the two is as follows: in the spatial filter 120 of FIG. 1, the light absorbing layer 124a of the light shielding structure 124 is disposed on the reflective layer 124r of the same light shielding structure 124; however, in a spatial filter 120C of FIG. 4, the light absorbing layer 124a of the light shielding structure 124 is disposed under the reflective layer 124r of the same light shielding structure 124. The image capture apparatus 100C has similar functions and advantages as those of the image capture apparatus 100 of FIG. 1, and detailed descriptions are not repeated hereinafter.

Figure 7:
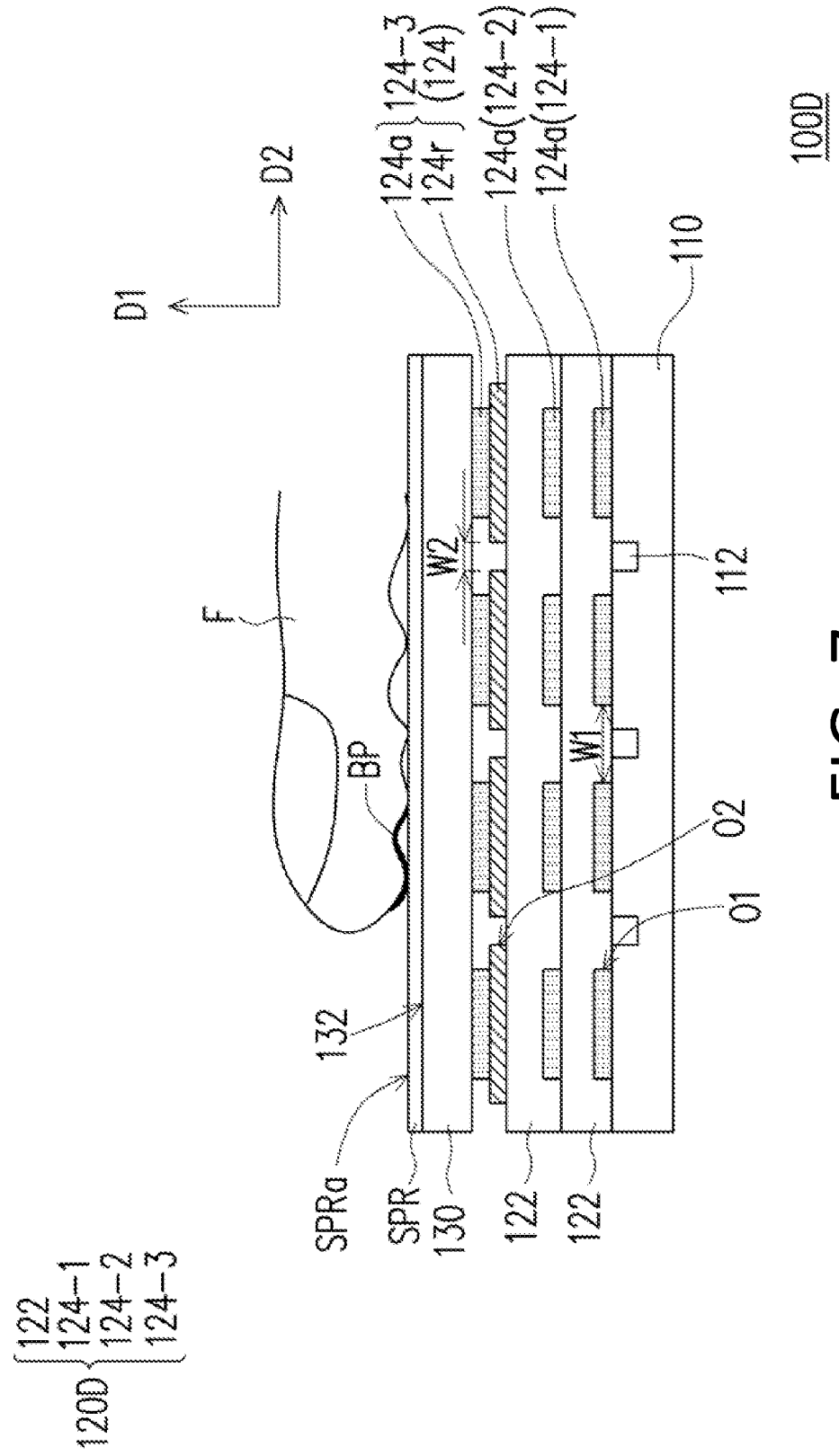
FIG. 7 is a schematic cross-sectional view of an image capture apparatus according to an embodiment of the present disclosure.

FIG. 7 is a schematic cross-sectional view of an image capture apparatus according to an embodiment of the present disclosure. An image capture apparatus 100D of FIG. 7 is similar to the image capture apparatus 100 of FIG. 1, and similar components are not repeated hereinafter. A difference between the two is as follows: a spatial filter 120D of FIG. 7 includes the light shielding structures 124-1, 124-2 and 124-3, wherein the light shielding structures 124-1 and 124-2 are closer to the image capture element 110 than the light shielding structure 124-3 is, and the light shielding structures 124-1 and 124-2 may have no reflective layer. The image capture apparatus 100D has similar functions and advantages as those of the image capture apparatus 100 of FIG. 1, and detailed descriptions are not repeated hereinafter.

Figure 8:
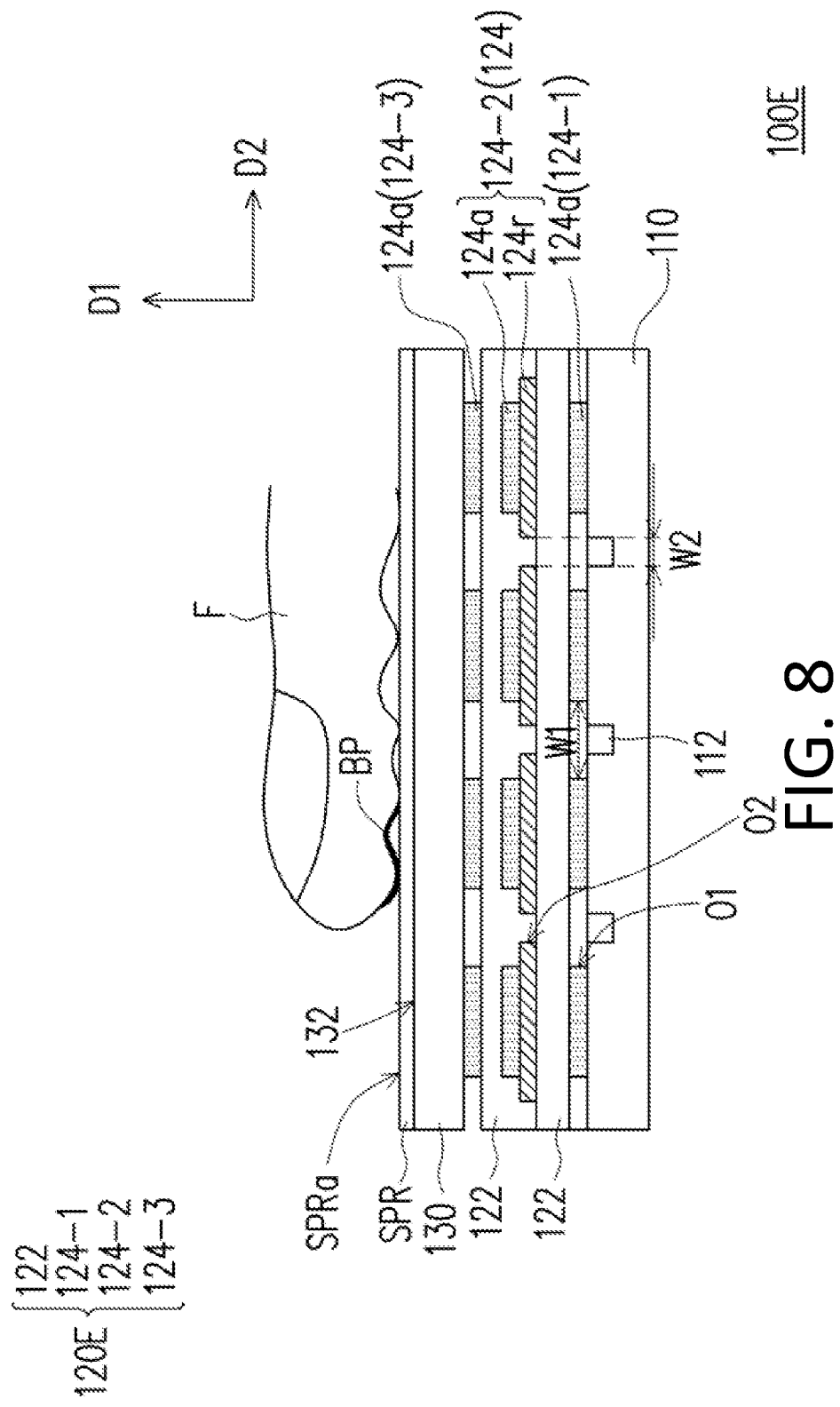
FIG. 8 is a schematic cross-sectional view of an image capture apparatus according to another embodiment of the present disclosure.

FIG. 8 is a schematic cross-sectional view of an image capture apparatus according to another embodiment of the present disclosure. An image capture apparatus 100E of FIG. 8 is similar to the image capture apparatus 100 of FIG. 1, and similar components are not repeated hereinafter. A difference between the two is as follows: a spatial filter 120E of FIG. 8 includes the light shielding structures 124-1, 124-2 and 124-3, wherein the light shielding structure 124-2 is disposed between the plurality of light shielding structures 124-1 and 124-3, and the light shielding structure 124-2 may have no reflective layer. The image capture apparatus 100E has similar functions and advantages as those of the image capture apparatus 100 of FIG. 1, and detailed descriptions are not repeated hereinafter.

Figure 9:
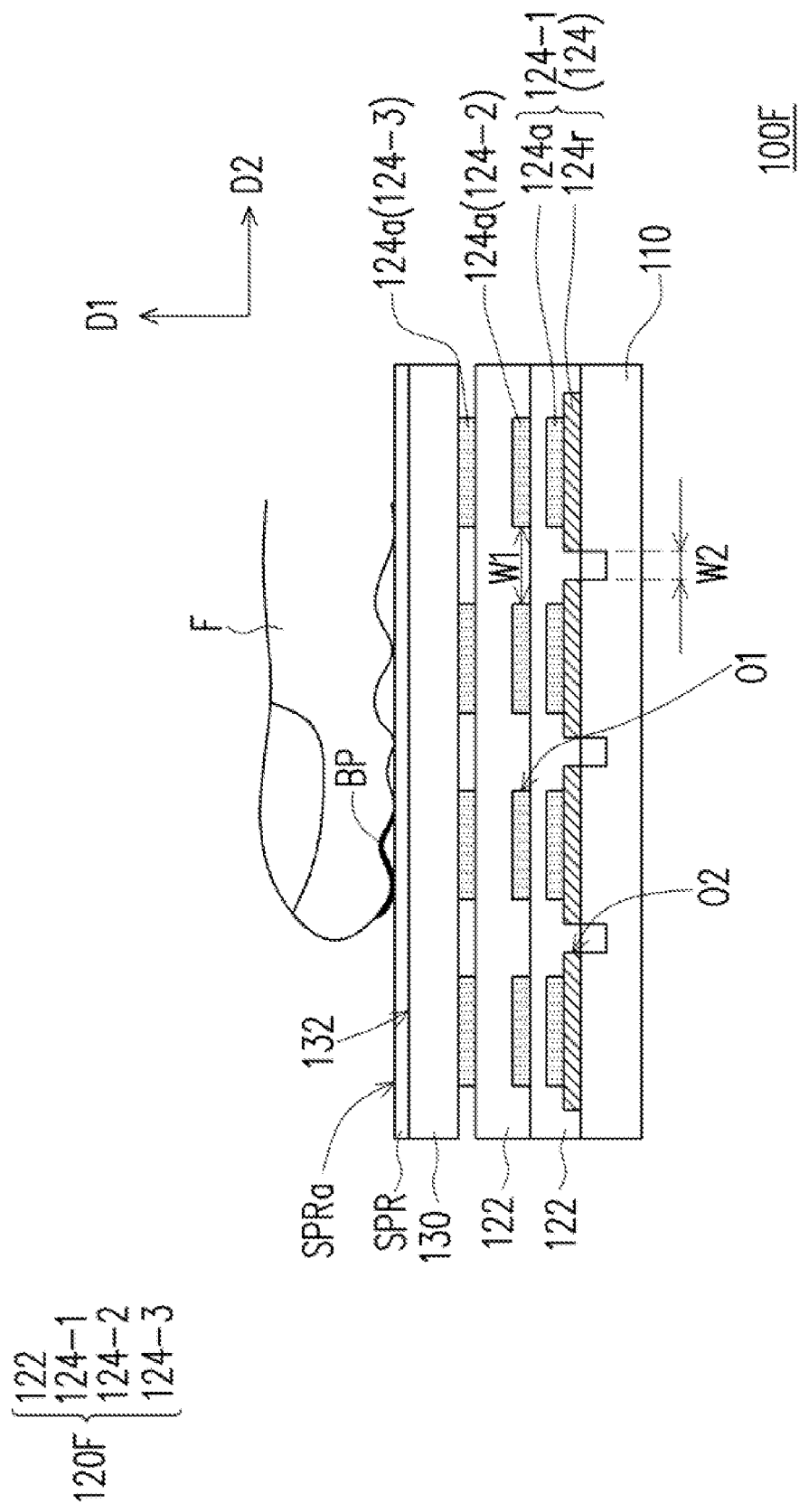
FIG. 9 is a schematic cross-sectional view of an image capture apparatus according to yet another embodiment of the present disclosure.

FIG. 9 is a schematic cross-sectional view of an image capture apparatus according to yet another embodiment of the present disclosure. An image capture apparatus 100F of FIG. 9 is similar to the image capture apparatus 100 of FIG. 1, and similar components are not repeated hereinafter. A difference between the two is as follows: a spatial filter 120F of FIG. 7 includes the light shielding structures 124-1, 124-2 and 124-3, wherein the light shielding structures 124-2 and 124-3 are farther away from the image capture element 110 than the light shielding structure 124-1 is, and the light shielding structures 124-2 and 124-3 may have no light absorbing layer. The image capture apparatus 100F has similar functions and advantages as those of the image capture apparatus 100 of FIG. 1, and detailed descriptions are not repeated hereinafter.

Figure 10:
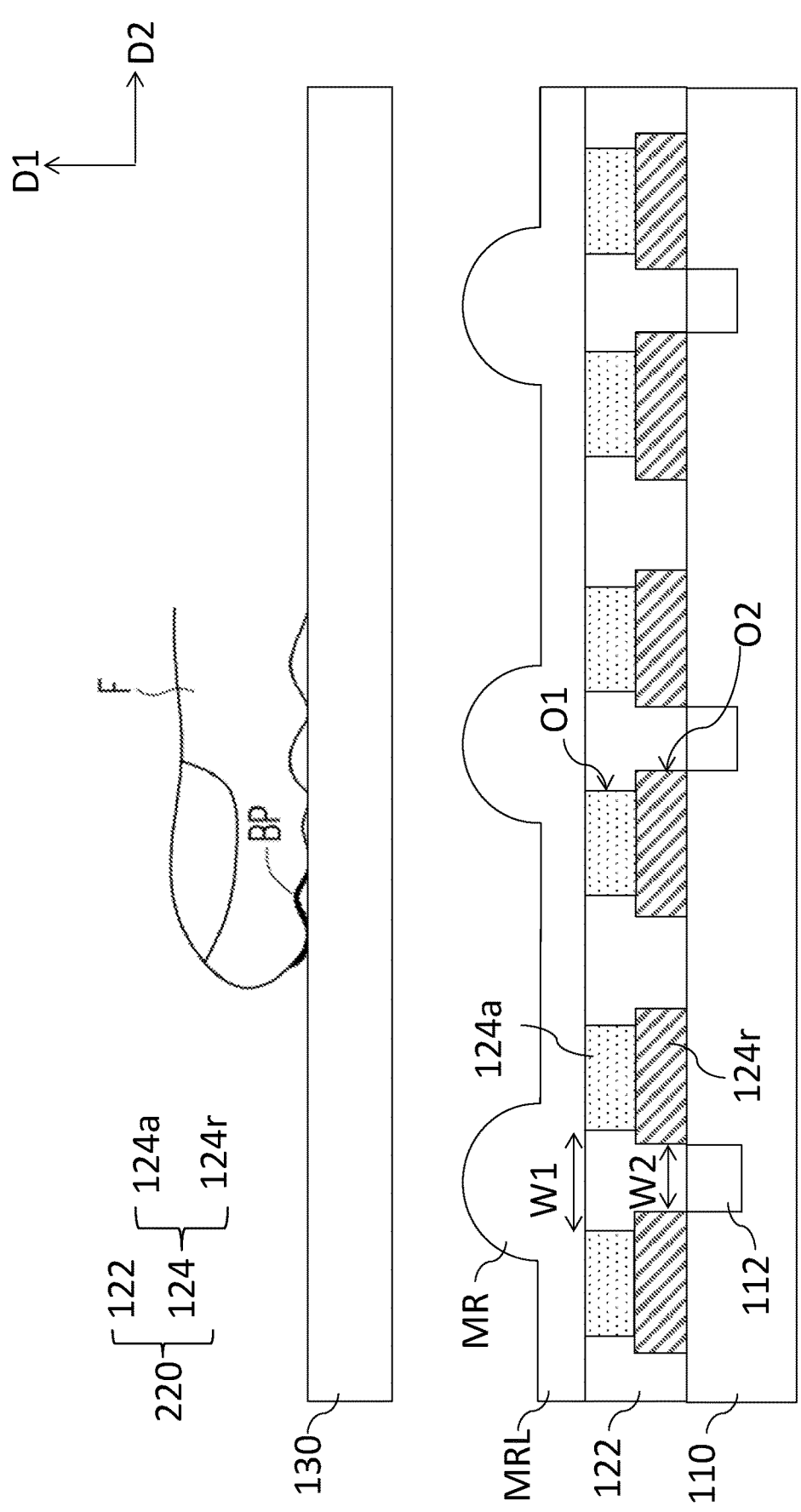
FIG. 10 is a schematic cross-sectional view of an image capture apparatus according to yet another embodiment of the present disclosure.

FIG. 10 is a schematic cross-sectional view of an image capture apparatus according to yet another embodiment of the present disclosure. Being different from embodiments of FIG. 1 to FIG. 9, the optical component layer further has a microstructure layer MRL formed on a spatial filter 220, and the spatial filter 220 can have at least one layer of the light shielding structure 124. The microstructure layer MRL can be adhered to the cover plate 130 by adhesion (such as, edge lamination or air bonding which forms an air gap between the cover plater 130 and microstructure layer MRL) or other fixing manner (such as, screwing or engaging manner). The microstructure layer MRL can be made of translucent or transparent material, and the present disclosure is not limited thereto. The microstructure layer MRL has a plurality of micro lenses MR, and each of the micro lenses MR is formed on the surface of the microstructure layer MRL and corresponds to the first opening O1, the second opening O2 and the pixel region 112 in the first direction D1. Further, the microstructure layer MRL and the translucent substrate 120 can be formed in the same process, and that is, the microstructure layer MRL can be one part of the translucent substrate 120.

It is noted that, since the micro lenses MR can focus the light beams on the light channels, the light beam usage efficiency is improved, and the image capture apparatus 200 can merely has one layer of the light shielding structure 124, which dramatically reduces thickness of the image capture apparatus 200. Further, by using the micro lenses MR, a good image capturing quality can be achieved, since the light beams are focused on the light channels and the crosstalk of the light beams with large incident angles are reduced.

The light absorbing layer 124a and the reflective layer 124r can be formed by one or combination of a deposition process, an etching process or photography process and other one process. Further, the light shielding structure 124 can be components adhered to the translucent substrate 120. The deposition process can be a physical vapor deposition (PVD) process, a chemical vapor deposition (CVD) process, a sputtering process, a resistive thermal evaporation process or an electron beam evaporation process and other one process, and the present disclosure is not limited thereto. The photography process can comprises a photoresist coating process, a soft baking process, a mask alignment process, an exposure process a post-exposure baking process, a photoresist lithography process, a rinsing process, a drying process (such as, a hard baking process), and so on, and the present disclosure is not limited thereto. The photography process can be replaced by other one process, such a maskless photolithography process, an electron-beam writing process or an ion-bema writing process. The etching process can be a dry etching process, a wet etching process or other one process, and the present disclosure is not limited thereto.

Furthermore, though the light structure 124 is formed by the light absorbing layer 124a and the reflective layer 124r, and the present disclosure is not limited thereto. In other embodiments, the light absorbing layer 124a can be replaced with a light shielding material layer which is able to prevent the light beam from propagating through the light shielding material layer. For example, the light shielding material layer is a high reflective material layer, and that is, the present disclosure does not limit the light shielding material layer to be the light absorbing layer 124a. The light shielding material layer can be made of black photoresist, black printed ink, black resin or other light shielding material. Moreover, preferably, the widths W1 and W2 can be 2-30 μm, and the present disclosure is not limited thereto. Further, there can be a display panel or a translucent substrate disposed on the cover spatial filter 120, or alternatively, the partial or all of the spatial filter 120 and the image capture element 110 can be integrated into a display panel (such as, a LCD panel), so as to form an in-cell display apparatus capable of the biometrics image. The first openings O1 and the second openings may be circular, square, rectangular or polygonal openings, the projection area of the micro lenses MR are circular, square, rectangular or polygonal area, and the present disclosure is not limited thereto.

Figure 11:
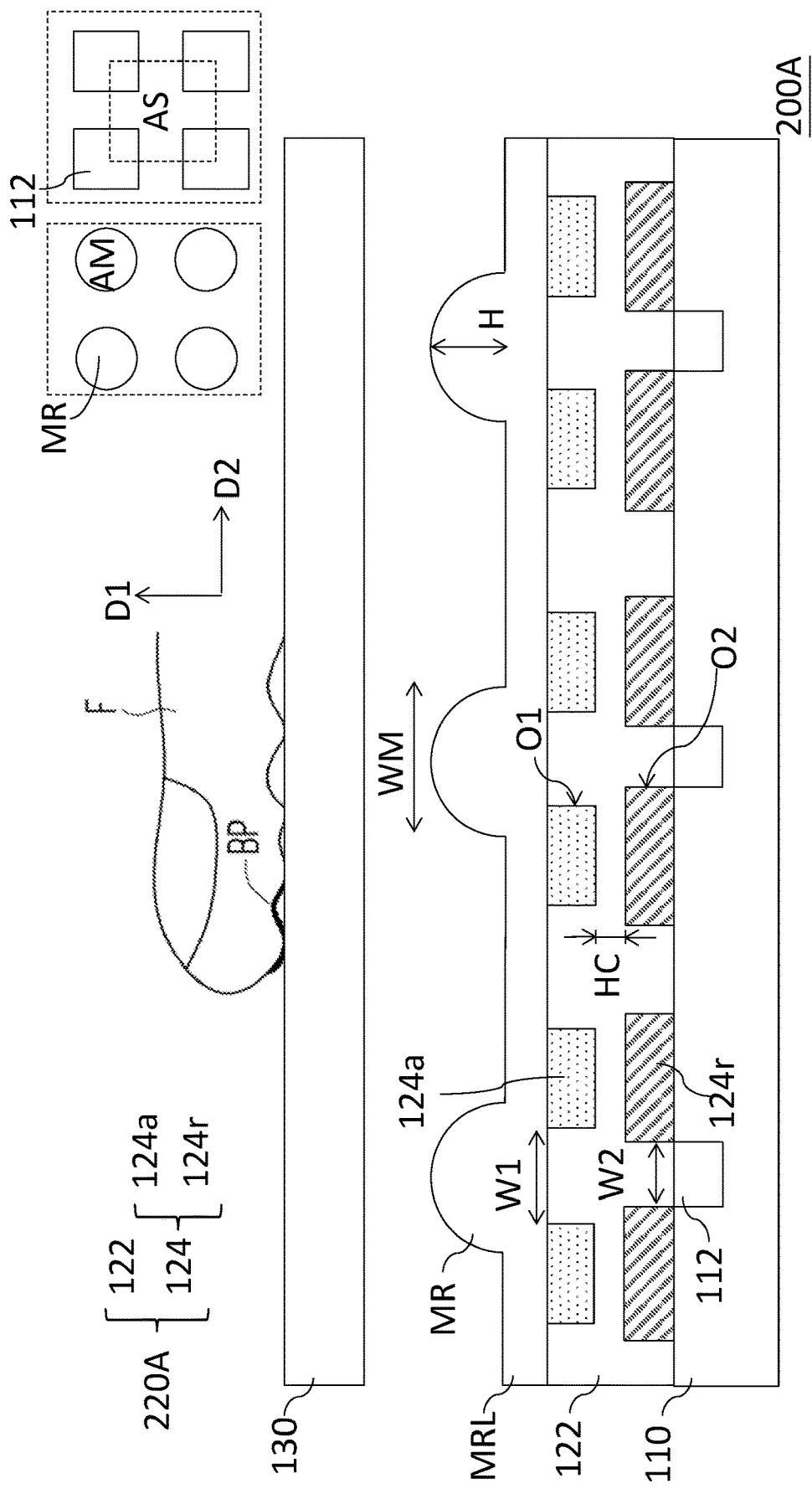
FIG. 11 is a schematic cross-sectional view of an image capture apparatus according to yet another embodiment of the present disclosure.

FIG. 11 is a schematic cross-sectional view of an image capture apparatus according to yet another embodiment of the present disclosure. Being different from the embodiment of FIG. 10, the light absorbing layer 124a and the reflective layer 124r of the spatial filter 220A in the image capture apparatus 200A have a distance HC therebetween in the first direction D1. To achieve the objective of the good image capturing quality, the projection area A1 of the first opening O1 and the projection area A2 of the second opening O2 should be less than the projection area AM of the micro lens MR and the sensing area AS of the pixel regions 112, i.e. A1<AS, A1<AM, A2<AS and A2<AM, wherein the sensing area AS of the pixel regions is an area formed by centers of the four adjacent pixel regions, which is shown at top right part of FIG. 11, the projection area AM of the micro lens MR is also shown at top right part of FIG. 11, and the projection area A1 of the first opening O1 and the projection area A2 of the second opening O2 can be known by referring to FIG. 2. Preferably, the projection area AM of the micro lens MR is designed to be less than the sensing area AS of the pixel regions 112, i.e. AM<AS, and the present disclosure is not limited thereto.

It is noted that, though in the embodiment of FIG. 11, the projection area A1 of the first opening O1 is larger than the projection area A2 of the second opening O2, i.e. A1>A2, the present disclosure is not limited thereto. In other embodiments, the projection area A1 of the first opening O1 is less than or equal to the projection area A2 of the second opening O2, i.e. A1=A2 or A1<A2. Moreover, to achieve better image capturing quality, the distance HC between the reflective layer 124r and the light absorbing layer 124a can be designed to satisfy the following equation:

$$HC \leq \pi((WM/2)^2 + H^2)/2H;$$

wherein WM is the width or diameter of the micro lens MR in the second direction D2, and H is the thickness of the micro lens MR in the first direction D1. Preferably, $HC \leq \pi((WM/2)^2 + H^2)/4H$. By the way, the distance HC between the reflective layer 124r and the light absorbing layer 124a can be zero, which is shown in the embodiment of FIG. 10.

Figure 12:
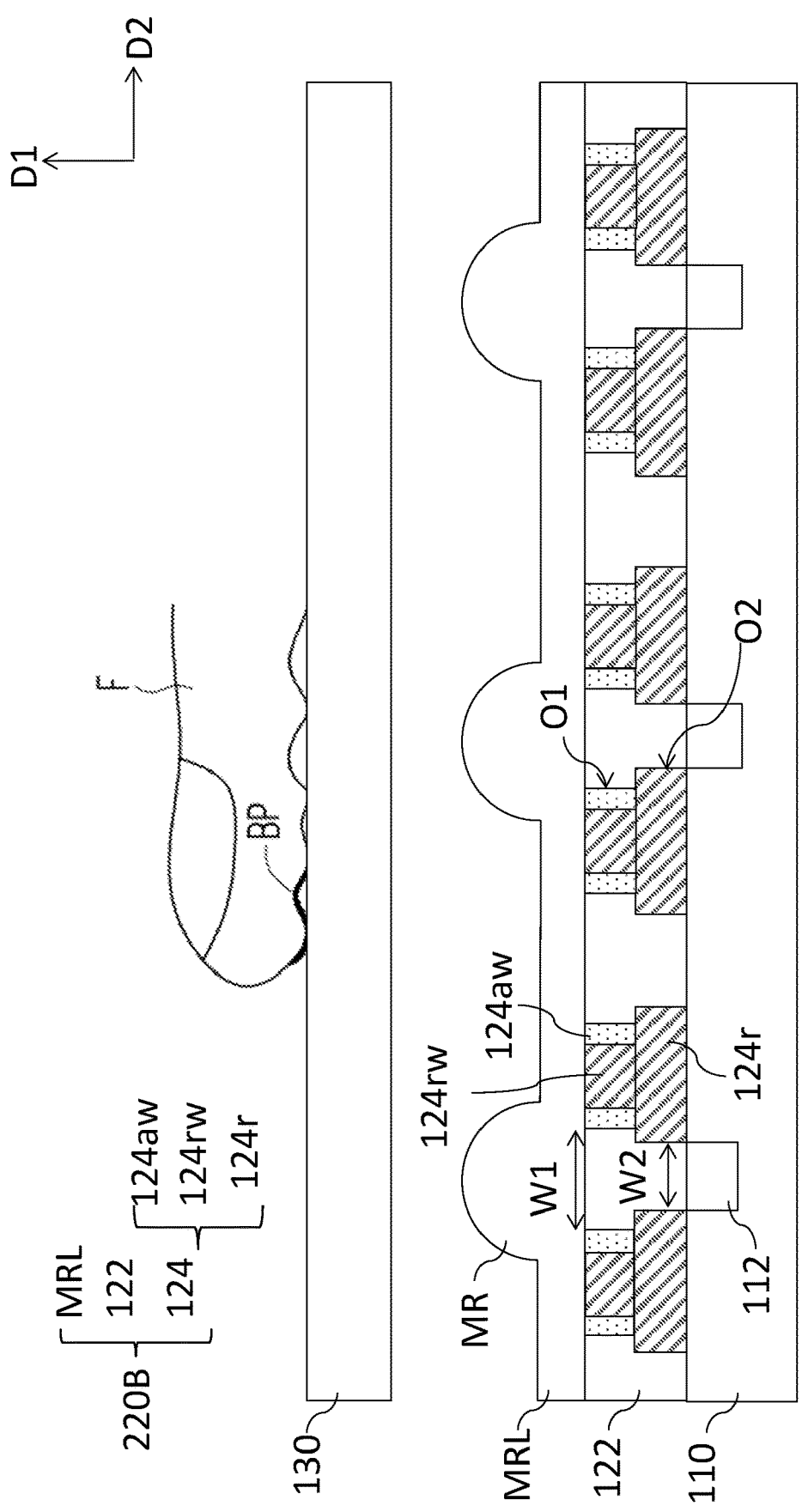
FIG. 12 is a schematic cross-sectional view of an image capture apparatus accompanying with plan views of micro lenses and pixel regions according to yet another embodiment of the present disclosure.

FIG. 12 is a schematic cross-sectional view of an image capture apparatus accompanying with plan views of micro lenses and pixel regions according to yet another embodiment of the present disclosure. Being different from the embodiment of FIG. 10, in the spatial filter 220B of the image capture apparatus 200B, the light absorbing layer 124a is formed by the structure of the light absorbing wall 124aw and the reflective layer 124rw, wherein the reflective layer 124rw is surrounded by the light absorbing wall 124aw in directions perpendicular to the first direction D1, such as the second direction D2. The light absorbing wall 124aw disposed around the reflective layer 124rw acts as the light absorbing layer 124a in other embodiments, which can reduce the crosstalk.

Figure 13:
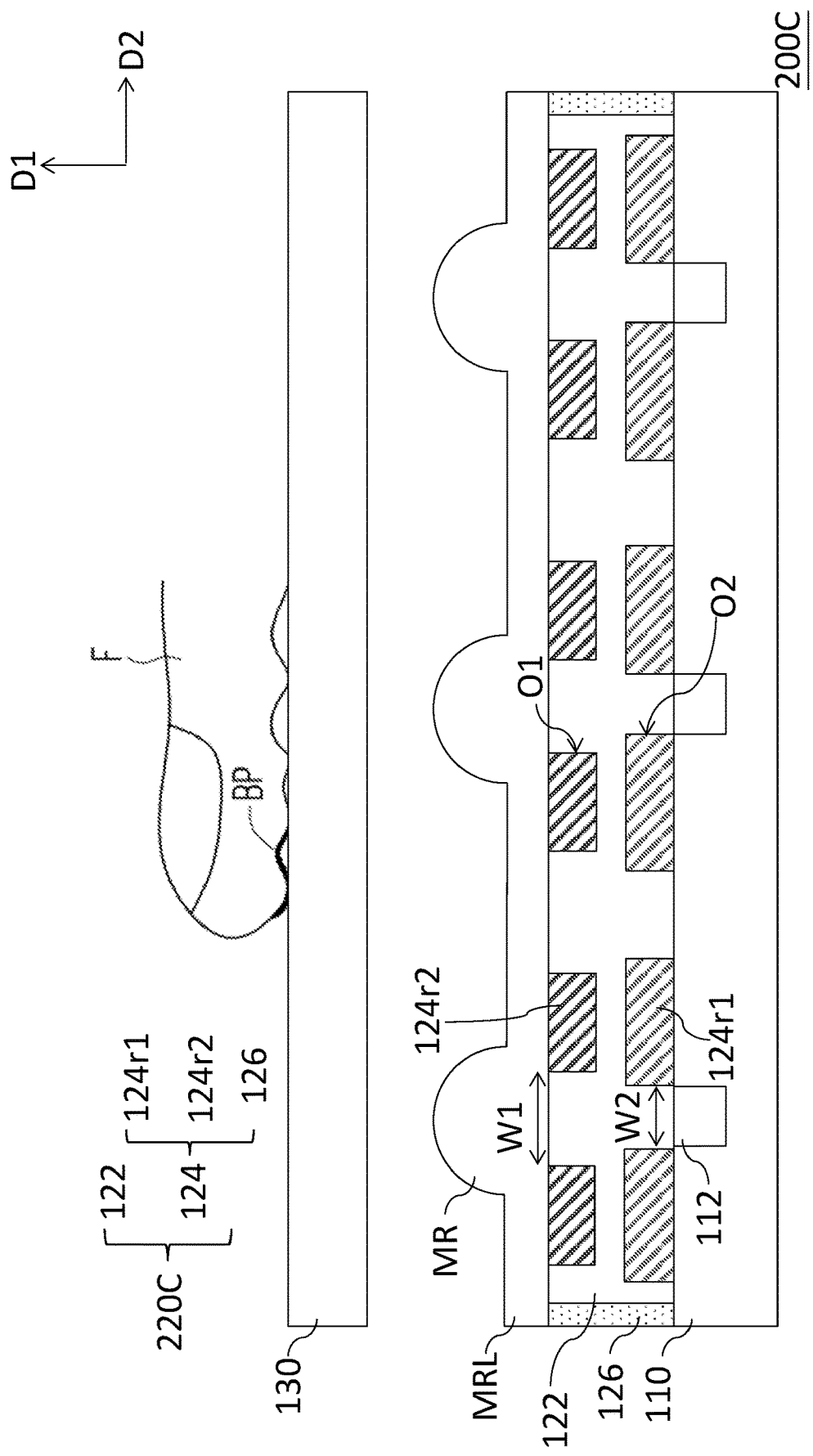
FIG. 13 is a schematic cross-sectional view of an image capture apparatus according to yet another embodiment of the present disclosure.

FIG. 13 is a schematic cross-sectional view of an image capture apparatus according to yet another embodiment of the present disclosure. Being different from the embodiment of FIG. 11, in the spatial filter 220C of the image capture apparatus 200C, the light shielding structure 124 is formed by reflective layers 124r1, 124r2 and two light absorbing walls 126 disposed on two edge sides of the translucent substrate 122 in the second direction D2. The reflect layer 124r2 is disposed on the reflective layer 124r1 with a distance therebetween. The light absorbing walls 126 act as the light absorbing layer 124a in other embodiments, which can reduce the crosstalk. Furthermore, in other embodiments, merely one absorbing wall 126 is used and disposed on one edge side of the translucent substrate 122.

Figure 14:
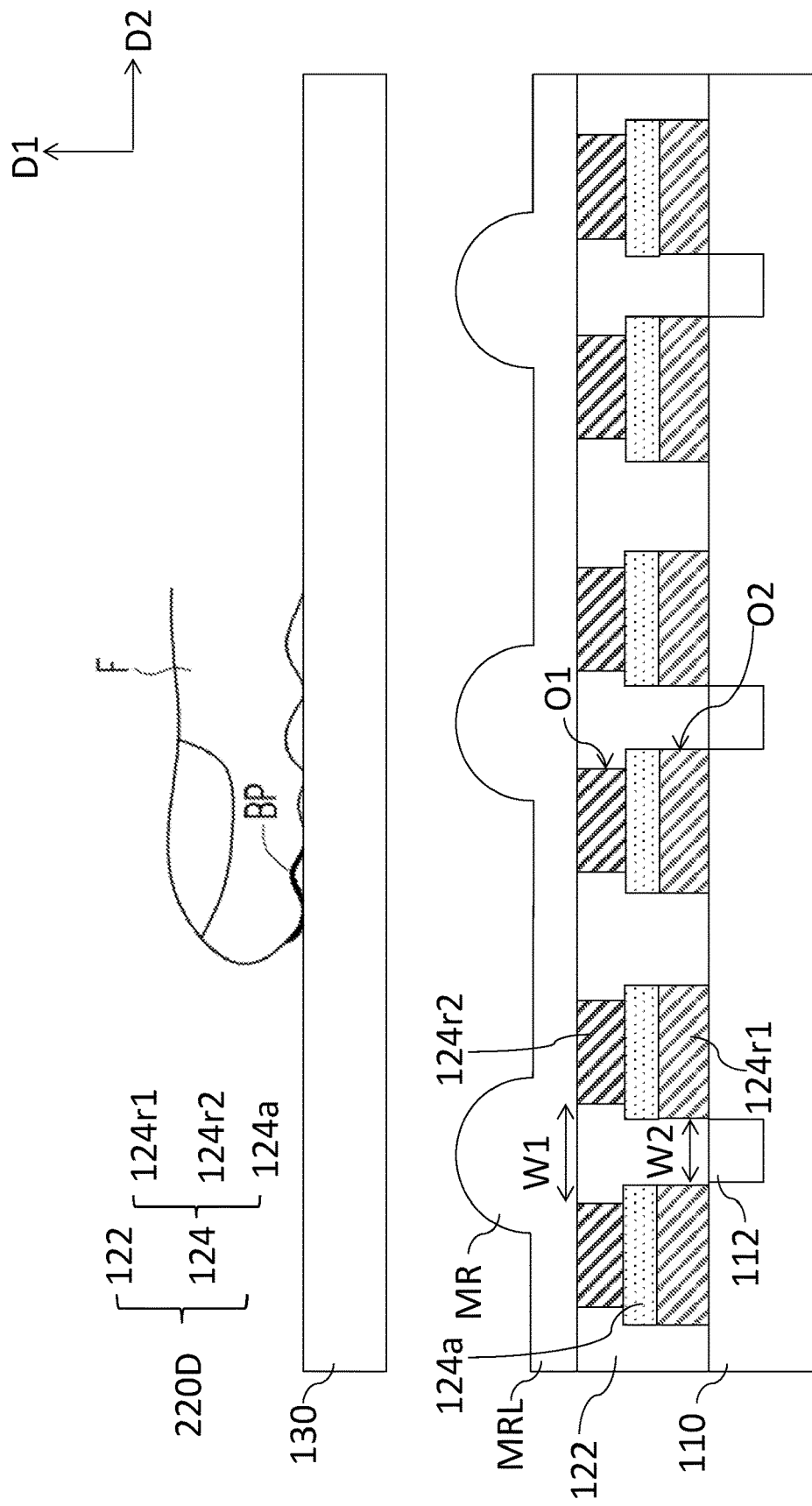
FIG. 14 is a schematic cross-sectional view of an image capture apparatus according to yet another embodiment of the present disclosure.

FIG. 14 is a schematic cross-sectional view of an image capture apparatus according to yet another embodiment of the present disclosure. Being different from the embodiment of FIG. 11, in the spatial filter 220D of the image capture apparatus 200D, the light shielding structure 124 is formed by reflective layers 124r1, 124r2 and an absorbing layer 124a disposed between the reflective layers 124r1 and 124r2 in the first direction D1. The reflect layer 124r2 is disposed on the reflective layer 124r1 with a distance therebetween. The absorbing layer 124a act as the light absorbing layer 124a in other embodiments, which can reduce the crosstalk.

Figure 15:
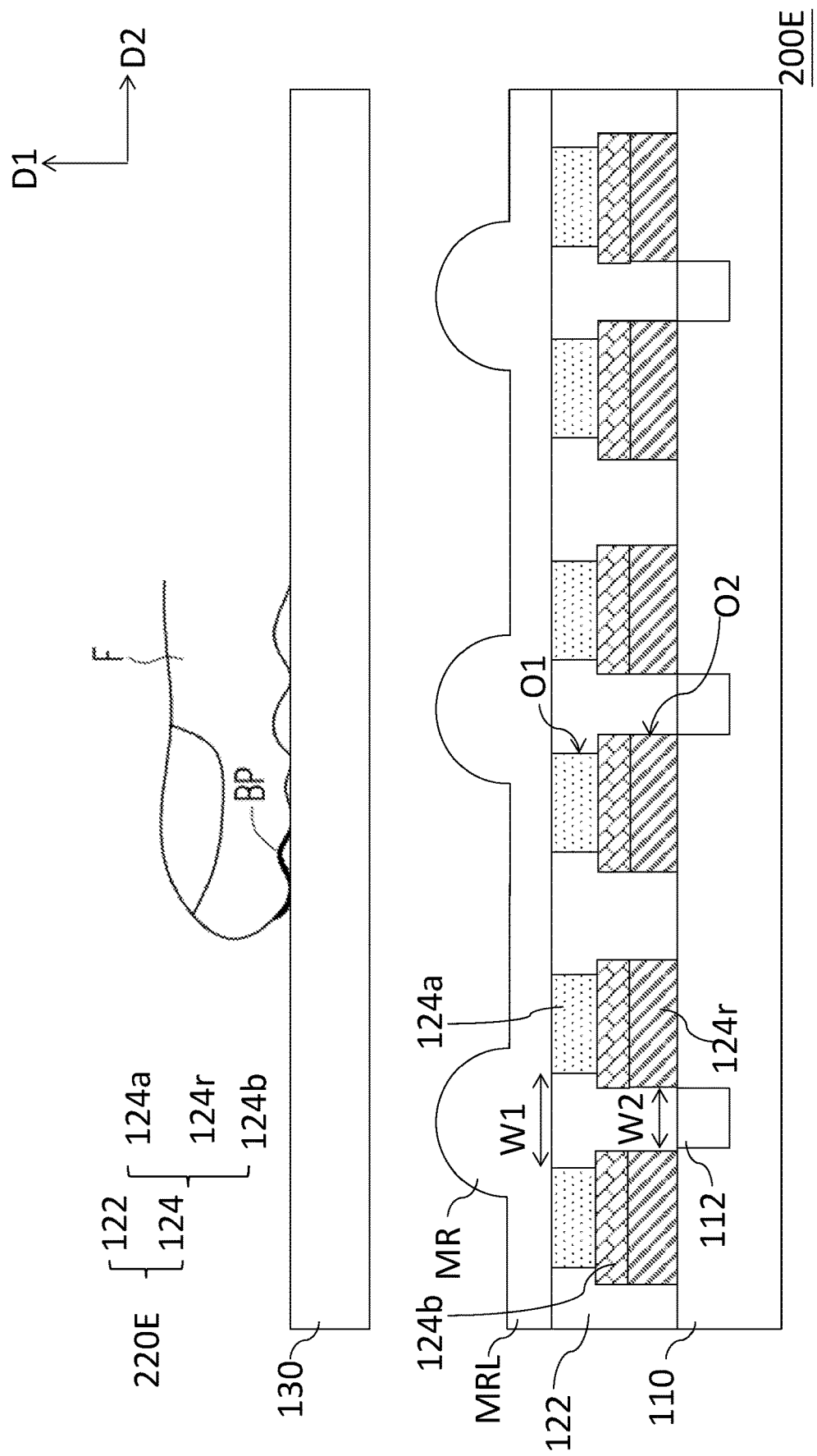
FIG. 15 is a schematic cross-sectional view of an image capture apparatus according to yet another embodiment of the present disclosure.

FIG. 15 is a schematic cross-sectional view of an image capture apparatus according to yet another embodiment of the present disclosure. Being different from the embodiment of FIG. 11, in the spatial filter 220E of the image capture apparatus 200E, the light shielding structure 124 further has an adhesion layer 124b between the light absorbing layer 124a and the reflective layer 124r in the first direction D1. In addition to implement the light absorbing layer 124a and the reflective layer 124r via the photography and etching process, one other way is to form the reflective layer 124r first, and then to adhere the light absorbing layer 124a to the reflective layer via the adhesion layer 124b.

Figure 16:
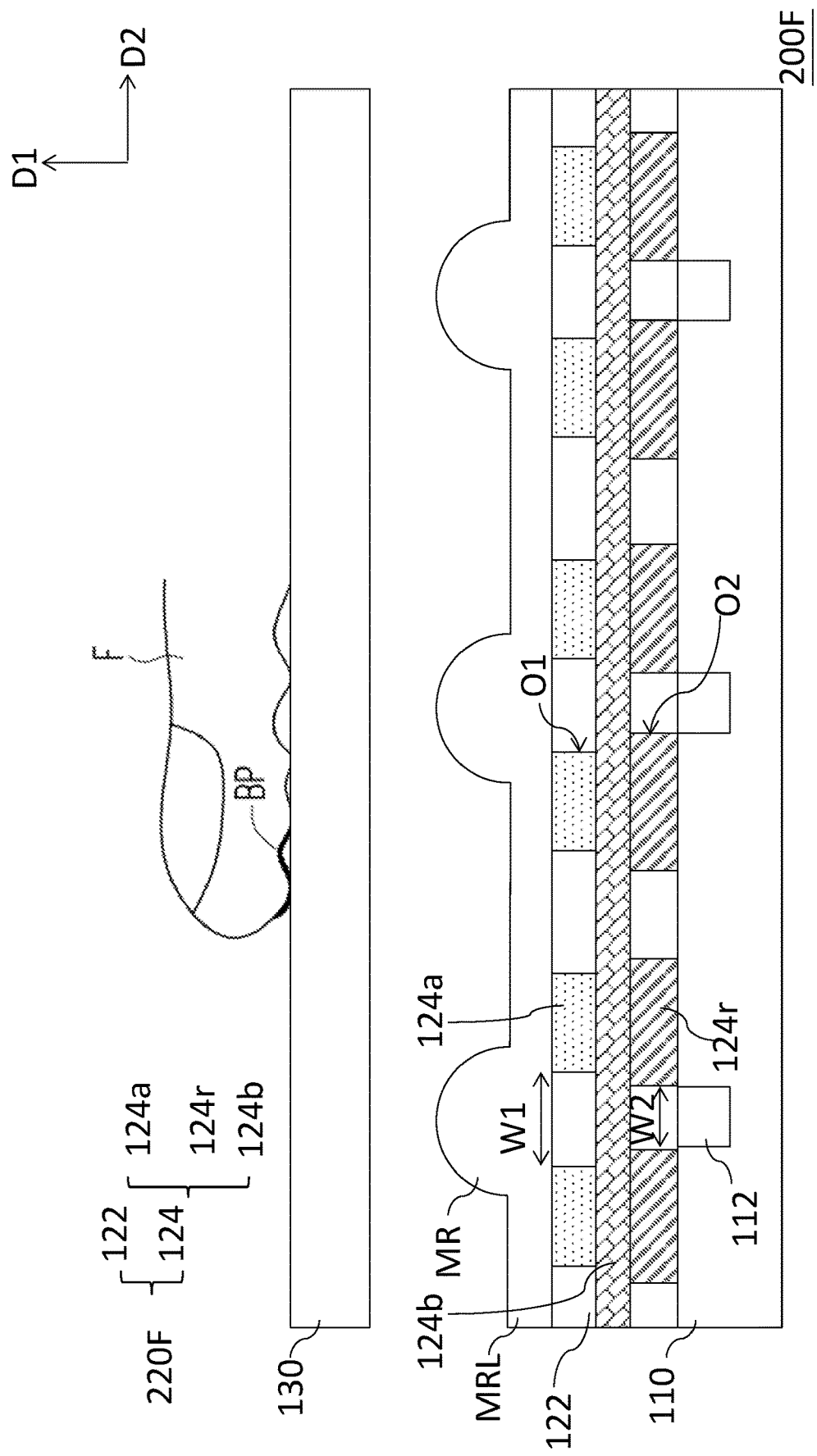
FIG. 16 is a schematic cross-sectional view of an image capture apparatus according to yet another embodiment of the present disclosure.

FIG. 16 is a schematic cross-sectional view of an image capture apparatus according to yet another embodiment of the present disclosure. Being different from the embodiment of FIG. 15, in the spatial filter 220F of the image capture apparatus 200F, the adhesion layer 124b is a continuous adhesion layer while the adhesion layer 124b in FIG. 15 has slice adhesion parts with a spacing distance.

Figure 17:
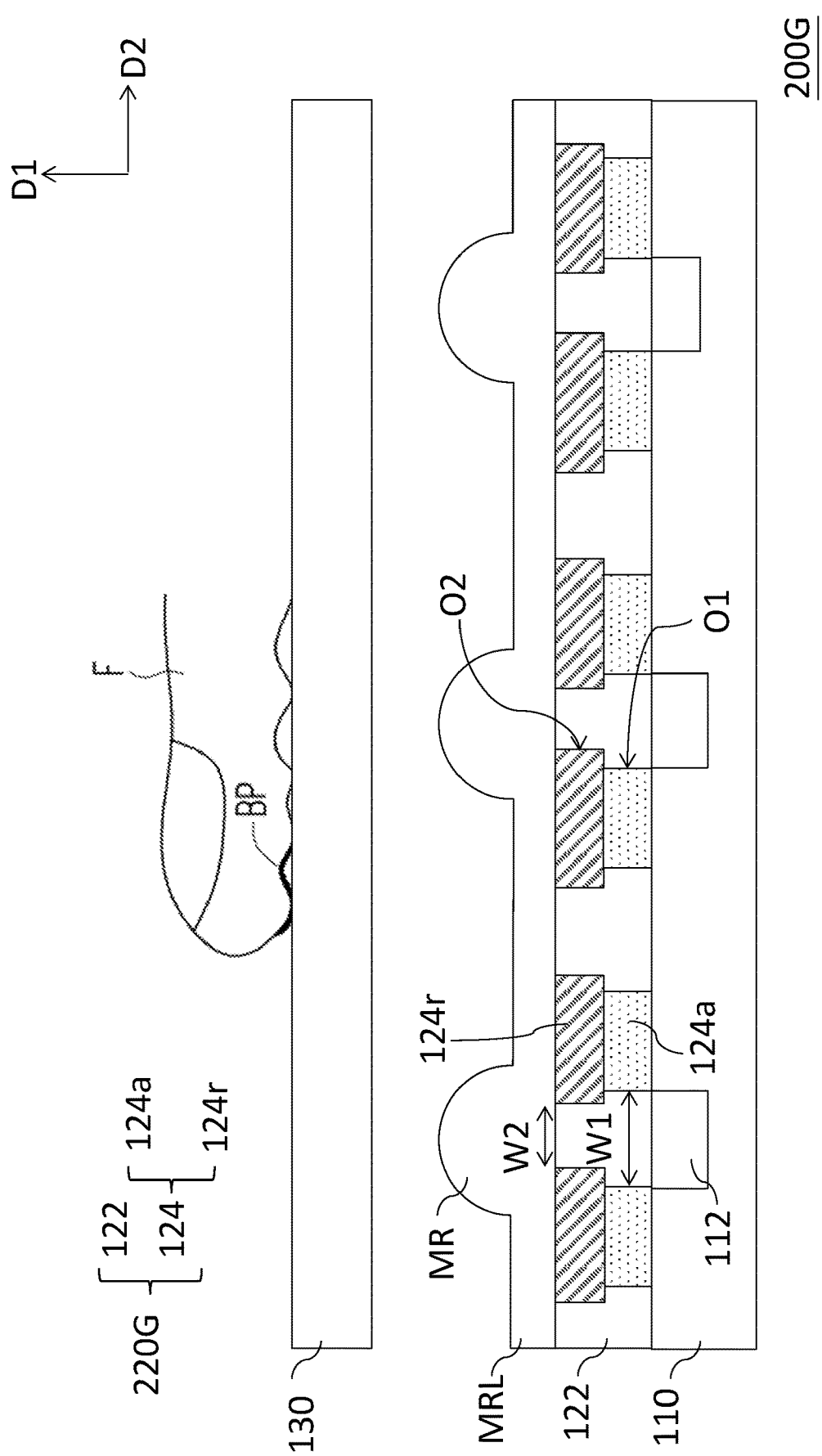
FIG. 17 is a schematic cross-sectional view of an image capture apparatus according to yet another embodiment of the present disclosure.

FIG. 17 is a schematic cross-sectional view of an image capture apparatus according to yet another embodiment of the present disclosure. Being different from the embodiment of FIG. 10, in the spatial filter 220G of the image capture apparatus 200G, the reflective layer 124r is disposed on the light absorbing layer 124a, the width W2 of the second opening O2 of the reflective layer 124r is less than the width W1 of the first opening O1 of the light absorbing layer 124a, and the present disclosure is not limited thereto. Or alternatively, in other one embodiment, the reflective layer 124r is disposed under the light absorbing layer 124a, the width W1 of the first opening O1 of the light absorbing layer 124a is less than the width W2 of the second opening O2 of a reflective layer 124r.

Figure 18:
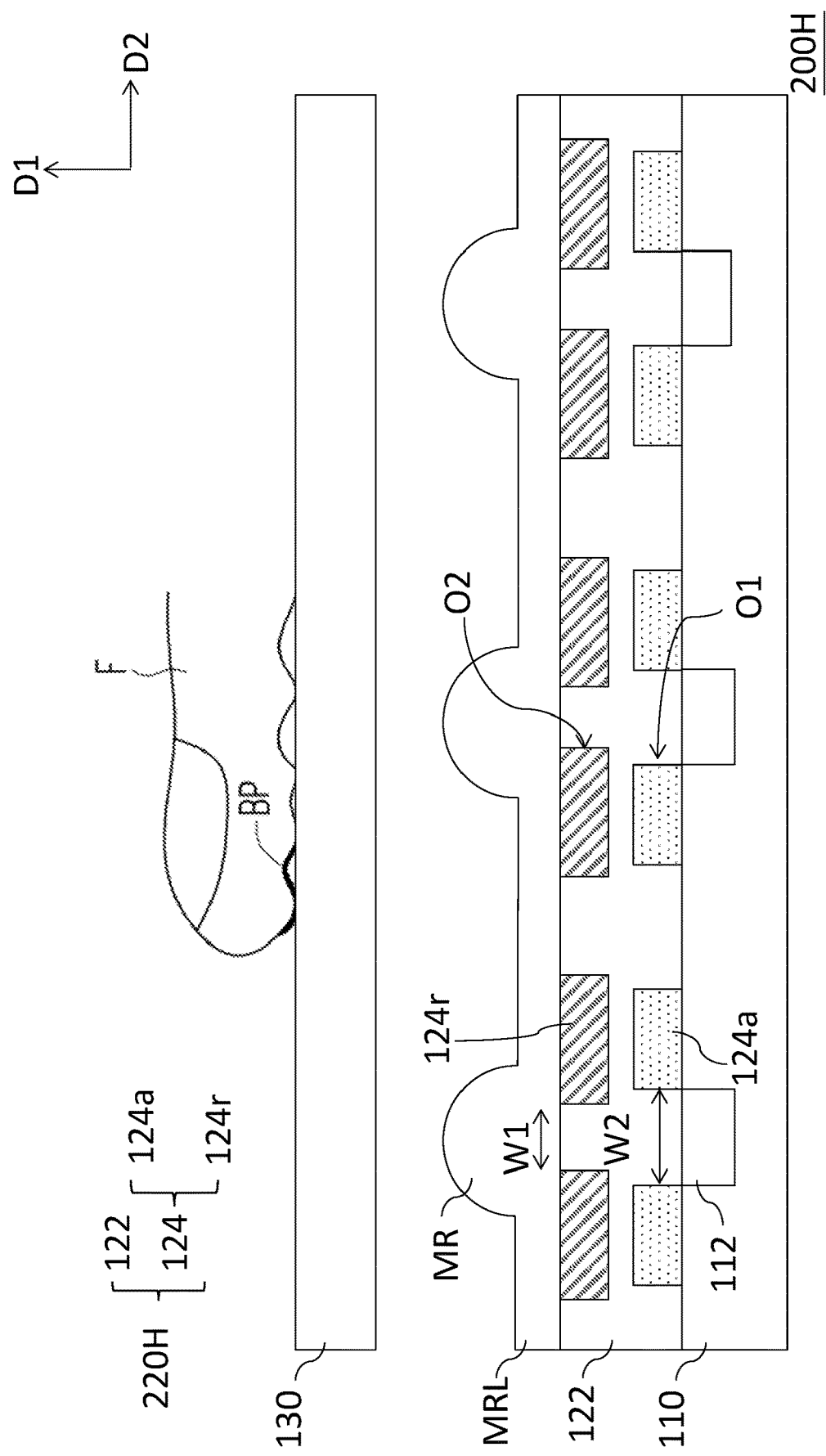
FIG. 18 is a schematic cross-sectional view of an image capture apparatus according to yet another embodiment of the present disclosure.

FIG. 18 is a schematic cross-sectional view of an image capture apparatus according to yet another embodiment of the present disclosure. Being different from the embodiment of FIG. 11, in the spatial filter 220H of the image capture apparatus 200H, the reflective layer 124r is disposed on the light absorbing layer 124a, the width W2 of the second opening O2 of the reflective layer 124r is less than the width W1 of the first opening O1 of the light absorbing layer 124a, and the present disclosure is not limited thereto. Or alternatively, in other one embodiment, the reflective layer 124r is disposed under the light absorbing layer 124a, the width W1 of the first opening O1 of the light absorbing layer 124a is less than the width W2 of the second opening O2 of a reflective layer 124r.

Figure 19:
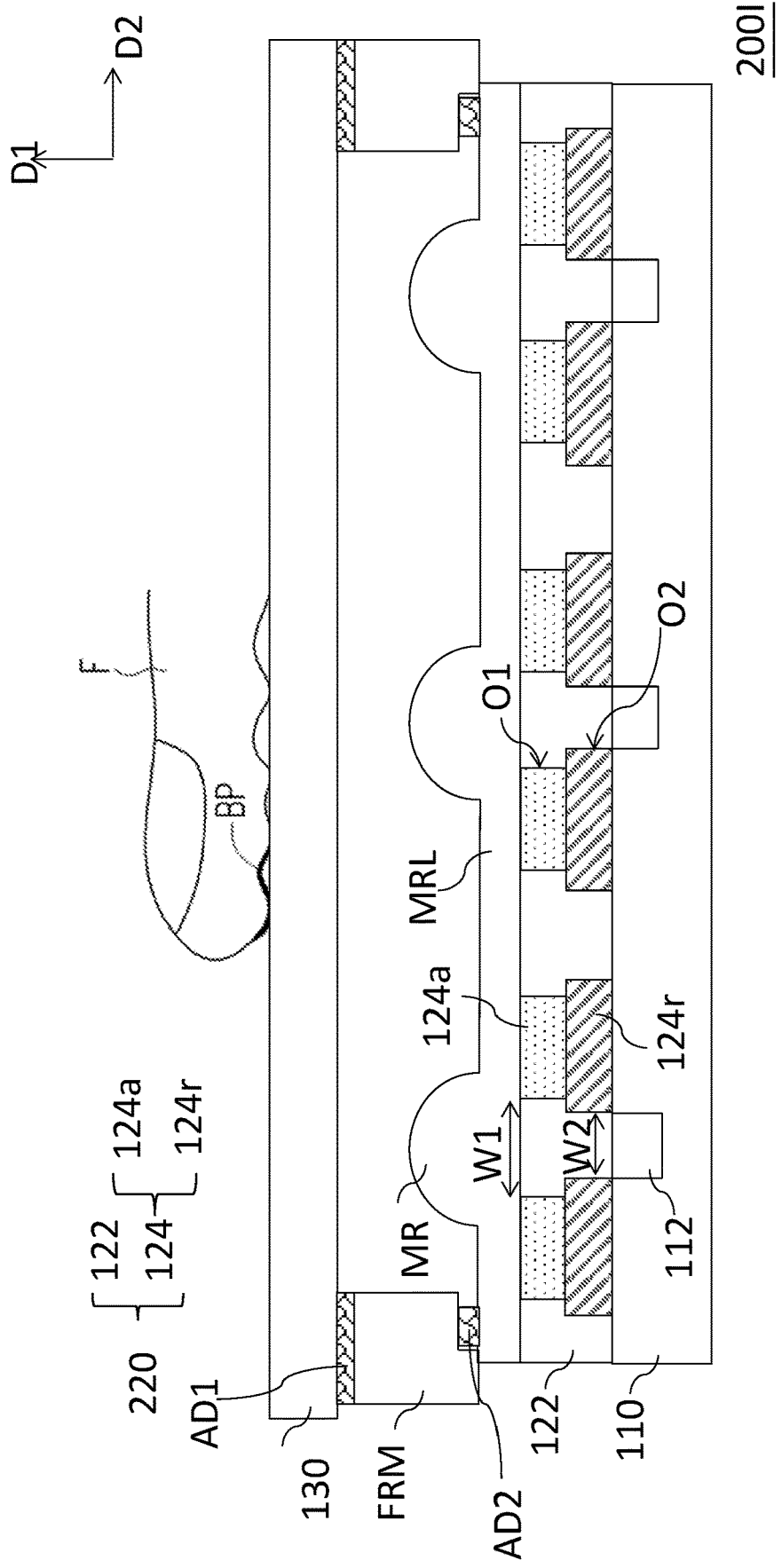
FIG. 19 is a schematic cross-sectional view of an image capture apparatus according to yet another embodiment of the present disclosure.

FIG. 19 is a schematic cross-sectional view of an image capture apparatus according to yet another embodiment of the present disclosure. Being different from the embodiment of FIG. 10, the image capture apparatus 200I further comprises a frame FRM and two adhesion layers AD1 and AD2. Bottom edge sides of the frame FRM are adhered to top edges sides of the microstructure layer MRL via the adhesion layer AD2, and top edge sides of the frame FRM are adhered to bottom edges sides of the cover plate 130 via the adhesion layer AD1. The projection of the adhesion layer AD2 on the cover plate 130 falls within the projection of the frame FRM on the cover plate 130. It is noted that, in other embodiments that the image capture apparatus does not has the microstructure layer MRL, the bottom edge sides of the frame FRM are adhered to top edges sides of the spatial layer 120 (or translucent substrate 122) via the adhesion layer AD2, and top edge sides of the frame FRM are adhered to bottom edges sides of the cover plate 130 via the adhesion layer AD2. Further, the fixing manner in the embodiment is not intended to limit the present disclosure. Further, it is noted that, in other one embodiments, no reflective layers are included in the spatial filter 220, and the spatial filter 220 can be formed by two stacked light absorbing layers.

It is noted that, an embodiment of the present disclosure further comprises an electronic apparatus which has one of the image capture apparatuses mentioned above. The electronic apparatus comprises a hardware circuit for implementing at least one specific function of the electronic apparatus and the image capture apparatus electrically connected to the hardware circuit. The electronic apparatus can be a smart phone, a notebook, a door lock device or other electronic apparatus which needs a function of biometrics identification.

Figure 20:
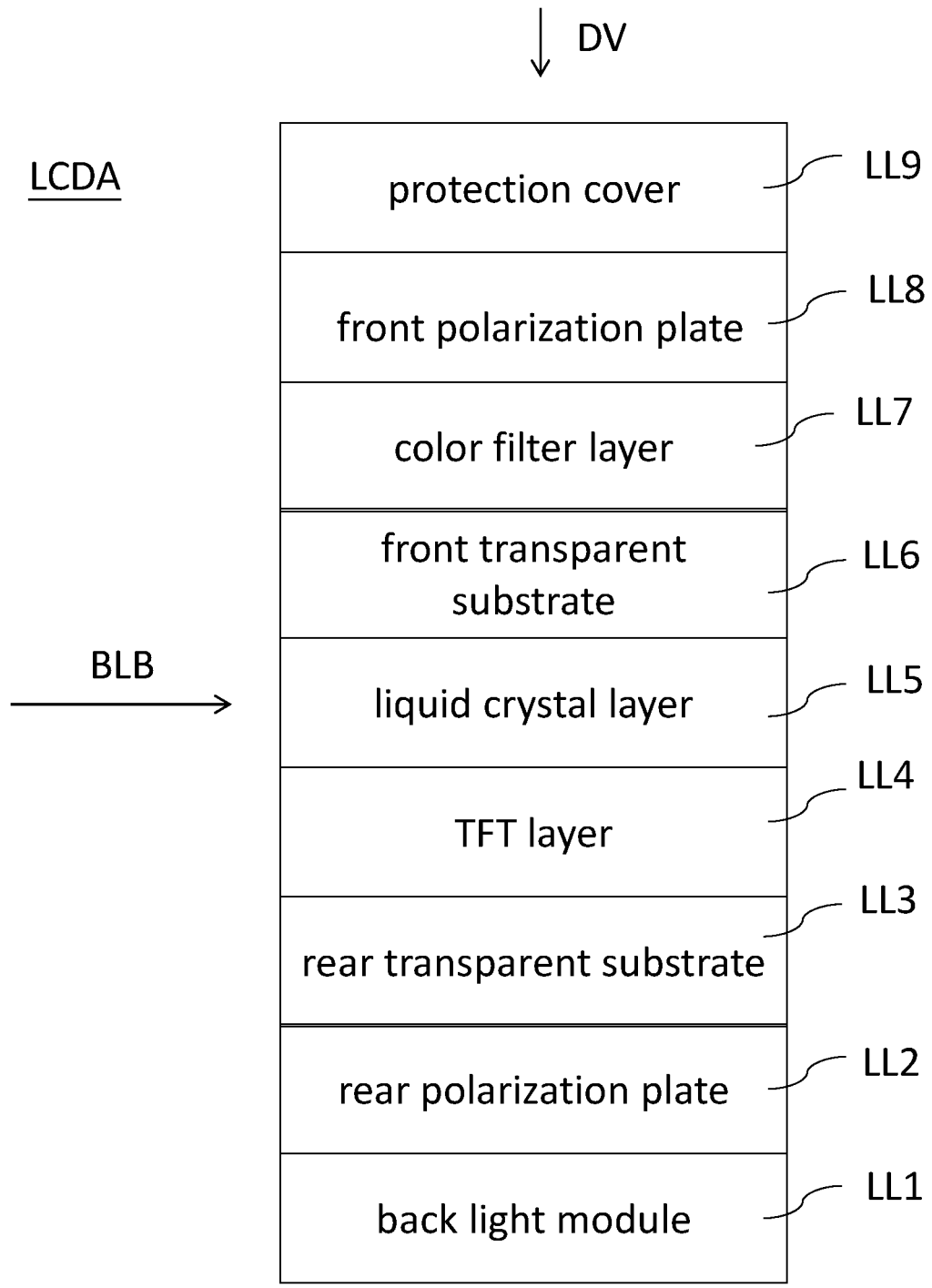
FIG. 20 is schematic cross-sectional view showing a stack structure of an in-cell display apparatus according to an embodiment of the present disclosure.

FIG. 20 is schematic cross-sectional view showing a stack structure of an in-cell display apparatus according to an embodiment of the present disclosure. From bottom to top, the in-cell display apparatus LCDA comprises a backlight module LL1, a rear polarization plate LL2, a rear transparent substrate LL3, a TFT layer LL4, a liquid crystal layer LL5, a front transparent substrate LL6, a color filter layer LL7, a front polarization plate LL8 and a protection cover LL9. The user view the screen of the in-cell display apparatus in the view direction DV, and the backlight beams BLB are guided to the liquid crystal layer LL5 which liquid crystal is controlled by the transistor of the TFT layer LL4. The protection cover LL9 in the embodiment can act as the cover plate of the image capture apparatus, and the image capture apparatus is integrated in TFT layer LL4, or in the TFT layer LL4, the liquid crystal layer LL5 and the color filter layer LL6. Specifically, the image capture element is implemented in the TFT layer LL4, and the optical component layer can be implemented in the TFT layer LL4 or in the TFT layer LL4, the liquid crystal layer LL5 and the color filter layer LL6. Further, the front transparent substrate LL6 and the TFT layer LL4 comprise electrodes when adopting the vertical alignment manner, but when adopting the in-plane switching manner, merely the TFT layer LL4 comprises electrodes. Since the image capture apparatus is mainly implemented in the TFT layer LL4, the thickness of the in-cell display apparatus is thus dramatically reduced.

Figure 21:
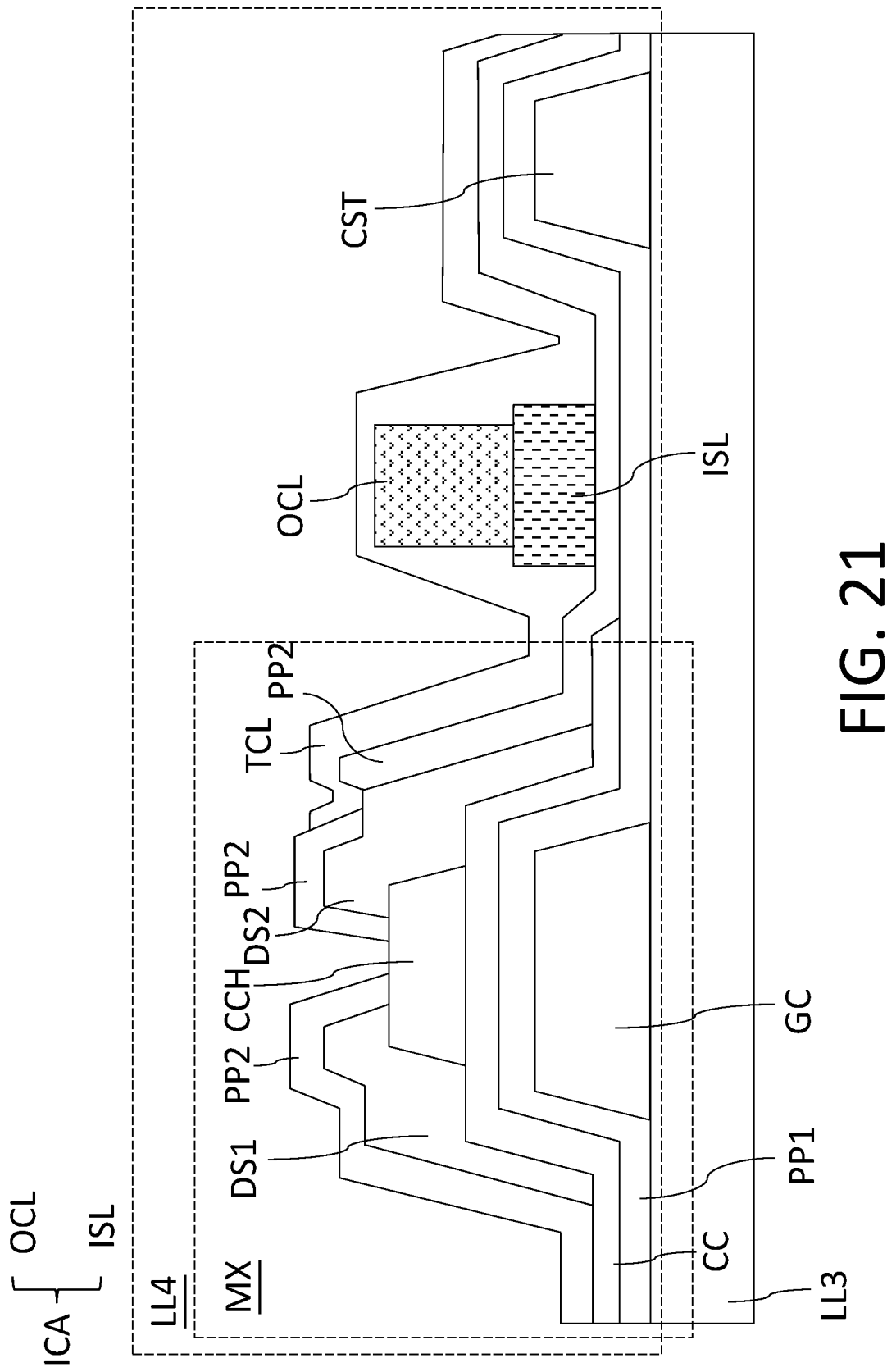
FIG. 21 is a schematic cross-sectional view of a thin film transistor layer with an image capture apparatus according to an embodiment of the present disclosure.

FIG. 21 is a schematic cross-sectional view of a thin film transistor layer with an image capture apparatus according to an embodiment of the present disclosure. In the embodiment, the image capture apparatus ICA having an optical component layer OCL and an image capture element ISL are formed in the TFT layer LL4, wherein the optical component layer OCL is disposed on the image capture element ISL. The TFT layer LL4 is formed on the rear transparent substrate LL3, and comprises a gate terminal GC, a source/drain terminals DS1, DS2, insulation layers PP1, PP2, CCH, a channel layer CC, the image capture apparatus ICA, a transparent conductive layer TCL and a storage capacitor sheet CST.

The transistor MX is formed as follows. The insulation layer PP1 covers the gate terminal GC and the storage capacitor sheet CST, and for example is made of $Si_3N_2$ or $SiO_2$. The channel layer CC is formed on insulation layer PP1 and corresponds to the gate terminal GC, and for example is made of IGZO. The insulation layer CCH is formed on the channel layer CC and corresponds to the gate terminal GC, and for example is made of $Si_3N_2$ or $SiO_2$. The insulation layer CCH is disposed between the source/drain terminals DS1 and DS2, the source/drain terminals DS1 and DS2 are formed on the channel layer CC and on top two opposite sides of the gate terminal GC, and for example are made of Al or Mo as well as the gate terminal GC. The insulation layer PP3 (made of $Si_3N_2$ or $SiO_2$, for example) covers the source/drain terminals DS1 and DS2 and partial of insulation layer CCH. The transparent conductive layer TCH (made of ITO, for example) is formed on and electrically connected to the source/drain terminal DS2 and extends the right in the embodiment which adopts the in-plane switching manner, and the present disclosure is not limited. When adopting vertical alignment manner, the transparent conductive layer TCH covers the insulation layers PP2 and CCH of the transistor MX.

A pre-charge capacitor can be implemented in the right. The storage capacitor sheet CST (made of Al or Mo, for example) is formed on the rear transparent substrate LL3. The insulation layer PP1 is formed on the storage capacitor sheet CST, the insulation layer PP3 is formed on the insulation layer PP1, and the transparent conductive layer TCH is formed on the insulation layer PP3. The image capture apparatus ICA is formed between the pre-charge capacitor and the transistor MX in the horizontal direction, and between the rear transparent substrate LL3 and the transparent conductive layer TCH in the vertical direction. In the region of the image capture apparatus ICA, though the image capture apparatus ICA is formed on the insulation layers LL1 and LL2, and under the transparent conductive layer TCH, the insulation layers LL1 and LL2 and the transparent conductive layer TCH can be removed. Further, the transparent conductive layer TCH can be one part of the optical component layer OCL in other embodiments.

The image capture apparatus can be any one image capture apparatus in the present disclosure, and can be any one the image capture apparatus described in the U.S. application Ser. No. 16/689,099 and the U.S. application Ser. No. 16/571,207. Other one image capture apparatus can be used in the present disclosure, and the optical component layer OCL can comprise a collimation layer formed by the collimating elements, black matrices and fibers, a layer of micro lenses, lenses, a layer of fiber grating and/or a reflective layer. It is noted that the image capture apparatus ICA can be formed in the process of forming the TFT layer LL4, even the conventional process of the TFT layer LL4 should be modified, the complexity and the cost will increase little.

Figure 22A:
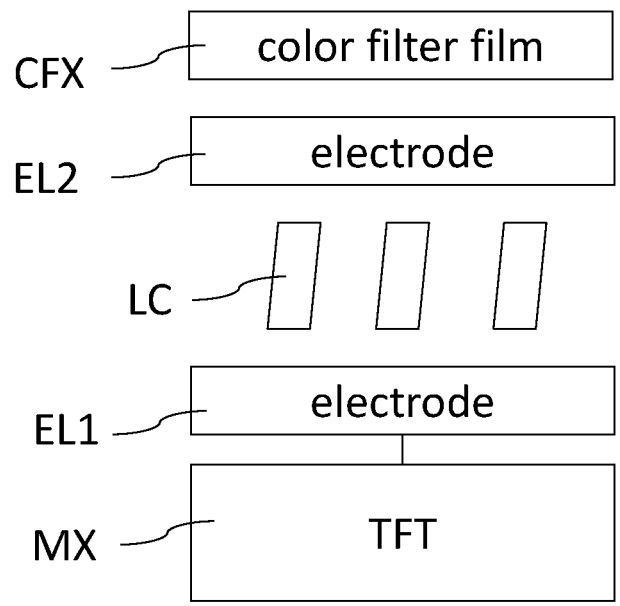
FIG. 22A is a schematic diagram showing liquid crystal driving of an in-cell display apparatus adopting a vertical alignment manner according to an embodiment of the present disclosure.

FIG. 22A is a schematic diagram showing liquid crystal driving of an in-cell display apparatus adopting a vertical alignment manner according to an embodiment of the present disclosure. In the embodiment, the liquid crystal LC between the electrode EL1 (formed by the transparent conductive layer) and the electrode EL2 of the front transparent substrate in the vertical direction is controlled by the transistor MX. The color filter film CFX of the color filter layer is disposed on the electrode EL2, and thus by controlling the rotation of the liquid crystal LC, a light beam with a corresponding brightness of the specific color is emitted.

Figure 22B:
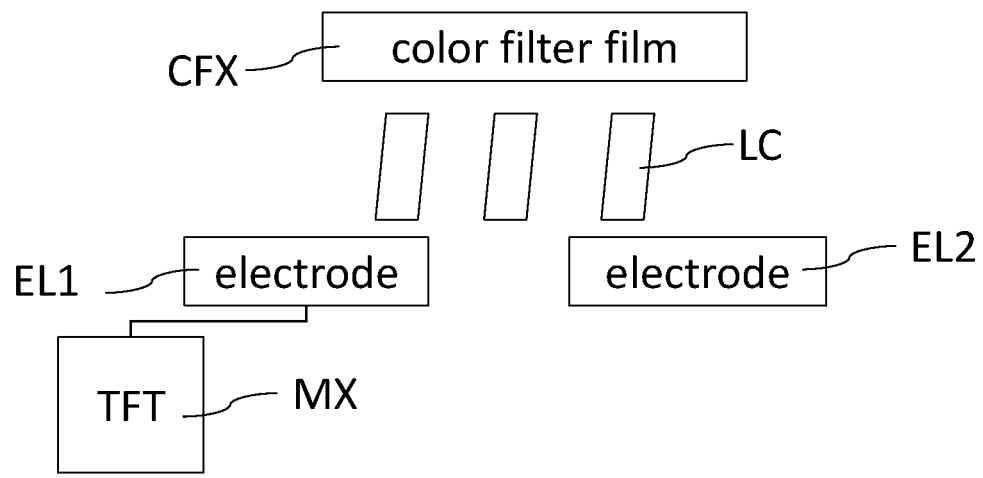
FIG. 22B is a schematic diagram showing liquid crystal driving of an in-cell display apparatus adopting an in-plane switching manner according to an embodiment of the present disclosure.

FIG. 22B is a schematic diagram showing liquid crystal driving of an in-cell display apparatus adopting an in-plane switching manner according to an embodiment of the present disclosure. In the embodiment, the liquid crystal LC between the electrode EL1 (formed by the transparent conductive layer) and the electrode EL2 (formed by the transparent conductive layer) in the horizontal direction is controlled by the transistor MX. The color filter film CFX of the color filter layer is disposed on the electrode EL2, and thus by controlling the rotation of the liquid crystal LC, a light beam with a corresponding brightness of the specific color is emitted.

Figure 23:
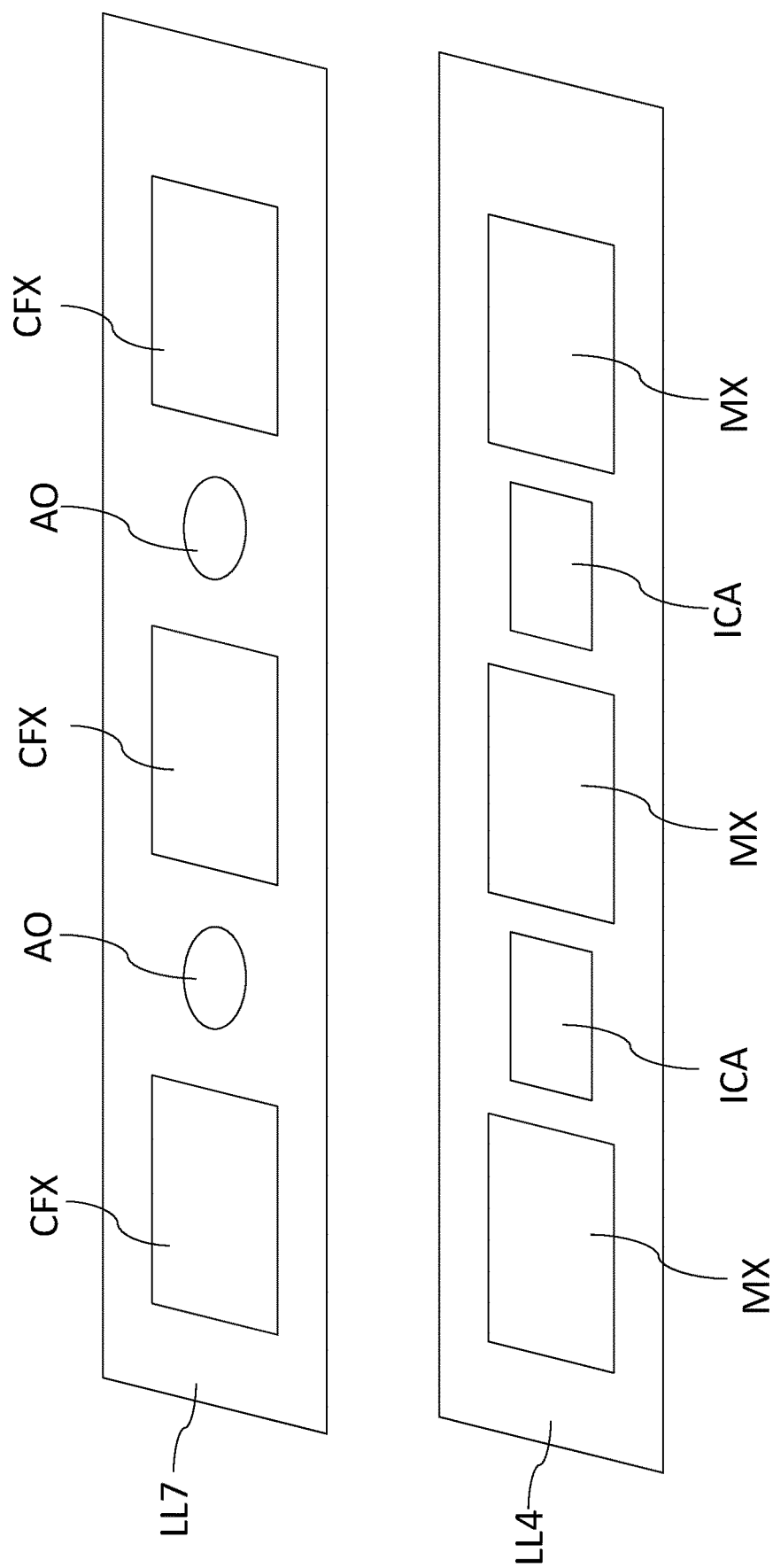
FIG. 23 is an explosive diagram showing a color filter layer and a thin film transistor layer of an in-cell display apparatus according to an embodiment of the present disclosure.

FIG. 23 is an explosive diagram showing a color filter layer and a thin film transistor layer of an in-cell display apparatus according to an embodiment of the present disclosure. In the embodiment, the vertical alignment manner of FIG. 22A is adopted, the transistor MX controls the rotation of its top liquid crystal, and there are aperture holes AO disposed between adjacent color filter films CFX of the color filter layer LL7 in the horizontal direction, and each of the aperture holes AO is disposed corresponding to one of the image capture apparatuses ICA of the TFT layer LL4 in the vertical direction. The light beams reflected from an object, such as a finger, can pass aperture holes AO, and the image capture apparatuses ICA thus acquire the biometrics image.

By the way, without affecting the displayed image quality, the liquid crystals are controlled to allow the light beams reflected from an object pass at some specific time. Since the light beams reflected from an object, such as a finger, can not only pass color filter films CFX but also reflect to the image capture apparatuses ICA via liquid crystals, the image capture apparatuses ICA thus collects the light beams passing the aperture holes AO and the liquid crystal to acquire the biometrics image, which achieves the better image capturing quality.

Figure 24:
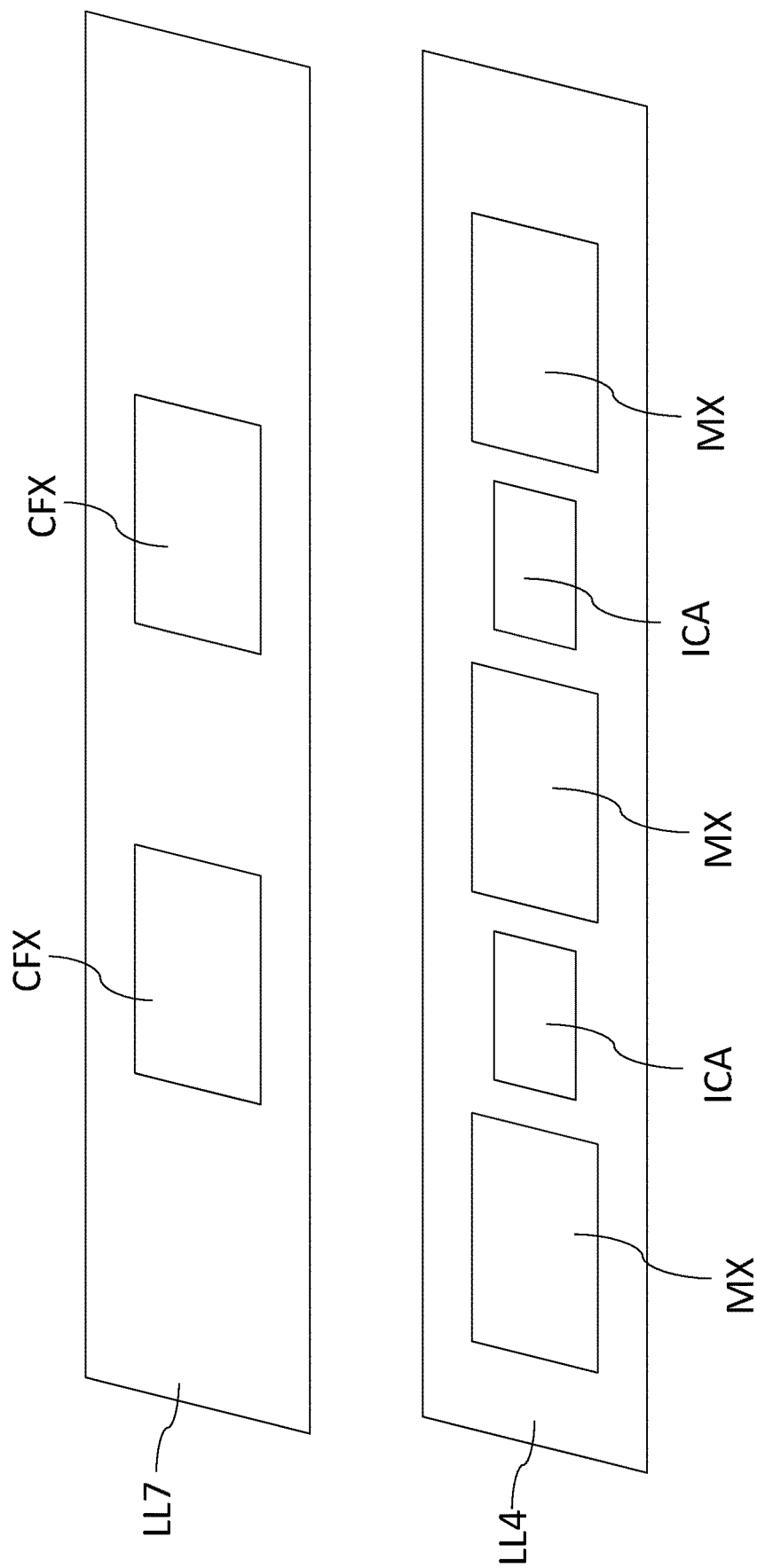
FIG. 24 is an explosive diagram showing a color filter layer and a thin film transistor layer of an in-cell display apparatus according to another embodiment of the present disclosure.

FIG. 24 is an explosive diagram showing a color filter layer and a thin film transistor layer of an in-cell display apparatus according to another embodiment of the present disclosure. In the embodiment, the in-plane switching manner of FIG. 22B is adopted, the transistor MX controls the rotation of its lateral liquid crystal, and there are no aperture holes AO disposed between adjacent color filter films CFX of the color filter layer LL7 in the horizontal direction, and each of the color filter films CFX is disposed corresponding to one of the image capture apparatuses ICA of the TFT layer LL4 in the vertical direction. The light beams reflected from an object, such as a finger, can pass color filter films CFX, and the image capture apparatuses ICA thus acquire the biometrics image. It is noted that, without affecting the displayed image quality, the liquid crystal are controlled to allow the light beams reflected from an object pass at some specific time.

Figure 25:
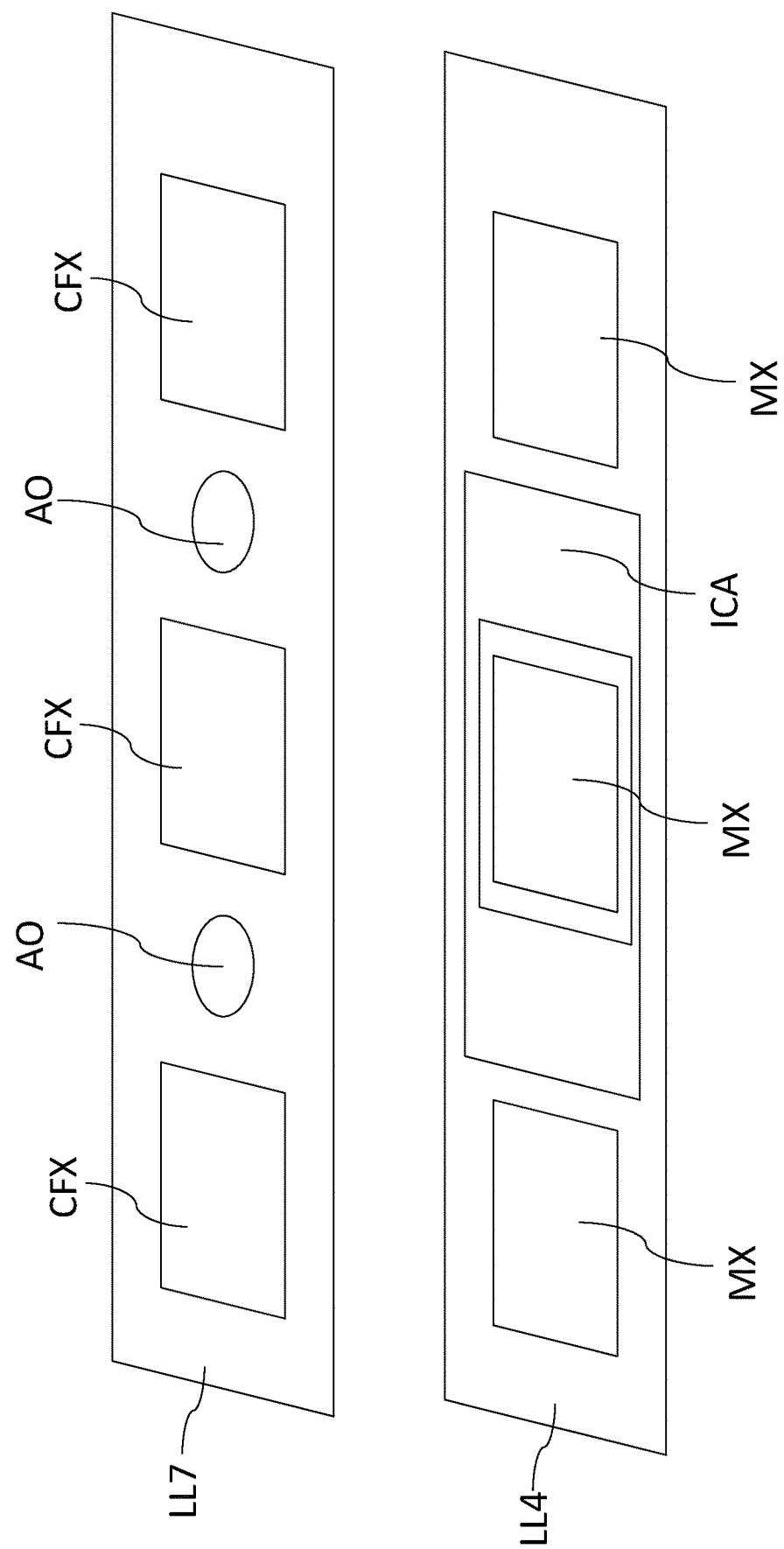
FIG. 25 is an explosive diagram showing a color filter layer and a thin film transistor layer of an in-cell display apparatus according to yet another embodiment of the present disclosure.

FIG. 25 is an explosive diagram showing a color filter layer and a thin film transistor layer of an in-cell display apparatus according to yet another embodiment of the present disclosure. In the embodiment, the vertical alignment manner of FIG. 22A is adopted, the transistor MX controls the rotation of its top liquid crystal, and there are aperture holes AO disposed between adjacent color filter films CFX of the color filter layer LL7 in the horizontal direction, and the aperture holes AO are disposed corresponding to one of the image capture apparatuses ICA of the TFT layer LL4 in the vertical direction. That is, the one image capture apparatuses ICA collects the light beams from the multiple aperture holes AO, so as to increase the image capturing quality, and further the manner can reduce the required aligning precision.

Figure 26:
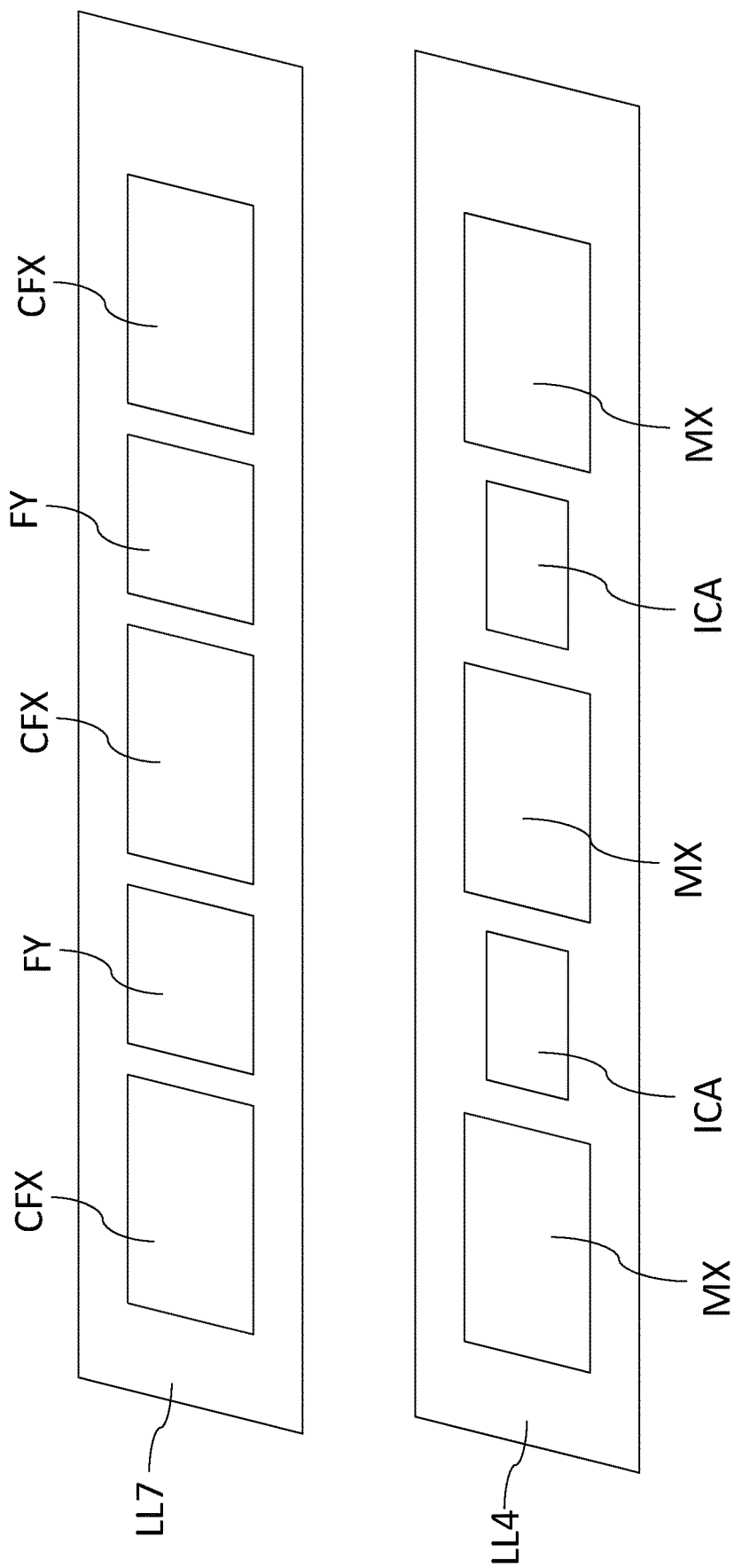
FIG. 26 is an explosive diagram showing a color filter layer and a thin film transistor layer of an in-cell display apparatus according to yet another embodiment of the present disclosure.

FIG. 26 is an explosive diagram showing a color filter layer and a thin film transistor layer of an in-cell display apparatus according to yet another embodiment of the present disclosure. In the embodiment, the vertical alignment manner of FIG. 22A is adopted, the transistor MX controls the rotation of its top liquid crystal, and there are white color, visual light or non-visual light (such as, infrared ray) films FY disposed between adjacent color filter films CFX of the color filter layer LL7 in the horizontal direction, and each of the white color, visual light or non-visual light films FY is disposed corresponding to one of the image capture apparatuses ICA of the TFT layer LL4 in the vertical direction. The light beams reflected from an object, such as a finger, can pass white color, visual light or non-visual light films FY, and the image capture apparatuses ICA thus acquire the biometrics image.

By the way, without affecting the displayed image quality, the liquid crystals are controlled to allow the light beams reflected from an object pass at some specific time. Since the light beams reflected from an object, such as a finger, can not only pass the white color, visual light or non-visual light films FY but also reflect to the image capture apparatuses ICA via liquid crystals, the image capture apparatuses ICA thus collects the light beams passing the white color, visual light or non-visual light films FY and the liquid crystal to acquire the biometrics image, which achieves the better image capturing quality.

Figure 27:
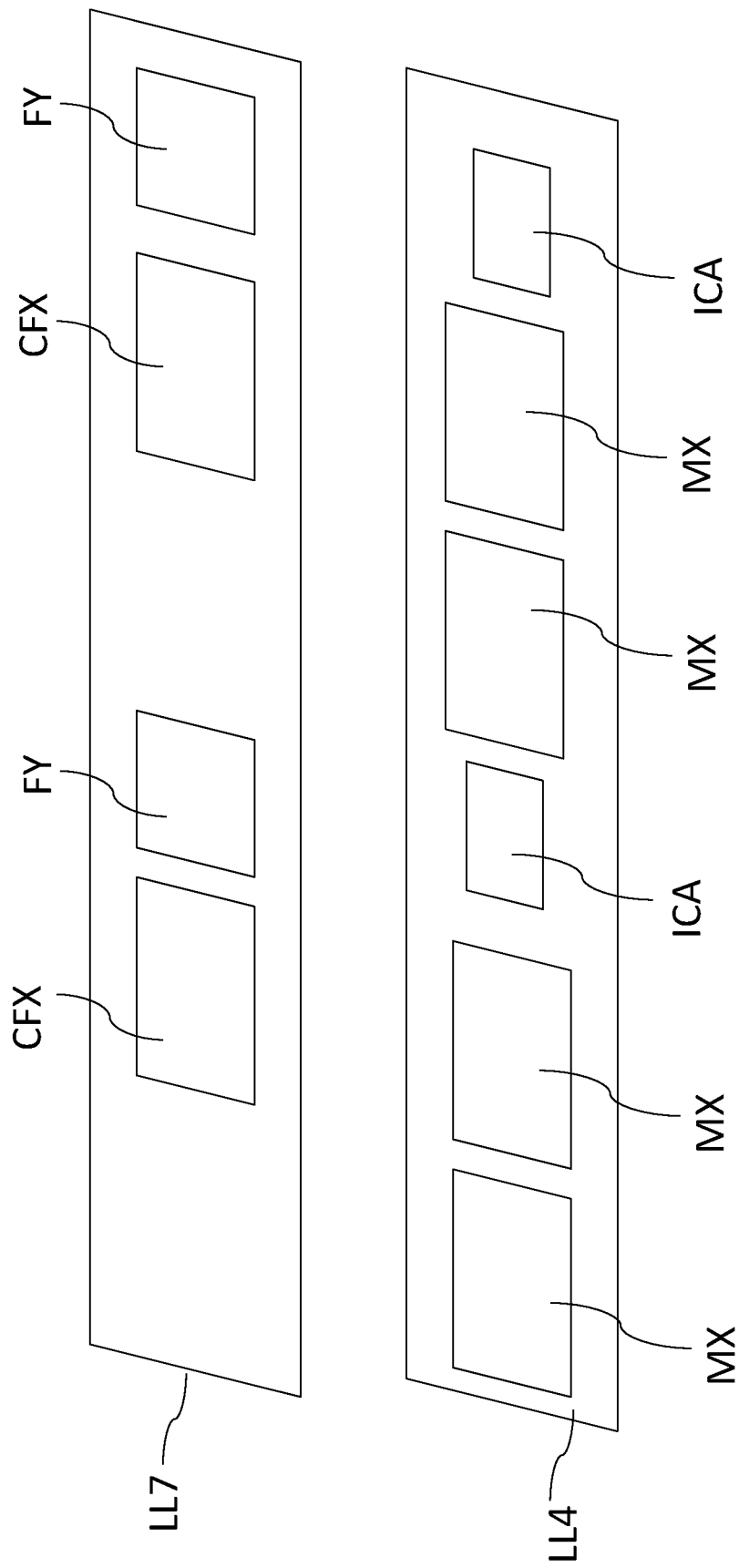
FIG. 27 is an explosive diagram showing a color filter layer and a thin film transistor layer of an in-cell display apparatus according to yet another embodiment of the present disclosure.

FIG. 27 is an explosive diagram showing a color filter layer and a thin film transistor layer of an in-cell display apparatus according to yet another embodiment of the present disclosure. In the embodiment, the in-plane switching manner of FIG. 22B is adopted, the transistor MX controls the rotation of its lateral liquid crystal, there are white color, visual light or non-visual light (such as, infrared ray) films FY disposed between adjacent color filter films CFX of the color filter layer LL7 in the horizontal direction, and each of the white color, visual light or non-visual light films FY is disposed corresponding to one of the image capture apparatuses ICA of the TFT layer LL4 in the vertical direction. Additionally set transistors MX in the TFT layer LL4 are used to control the liquid crystals under the white color, visual light or non-visual light films FY. Thus, the additionally set transistors MX in the TFT layer LL4 are used to control the capturing of the biometrics image.

Figure 28:
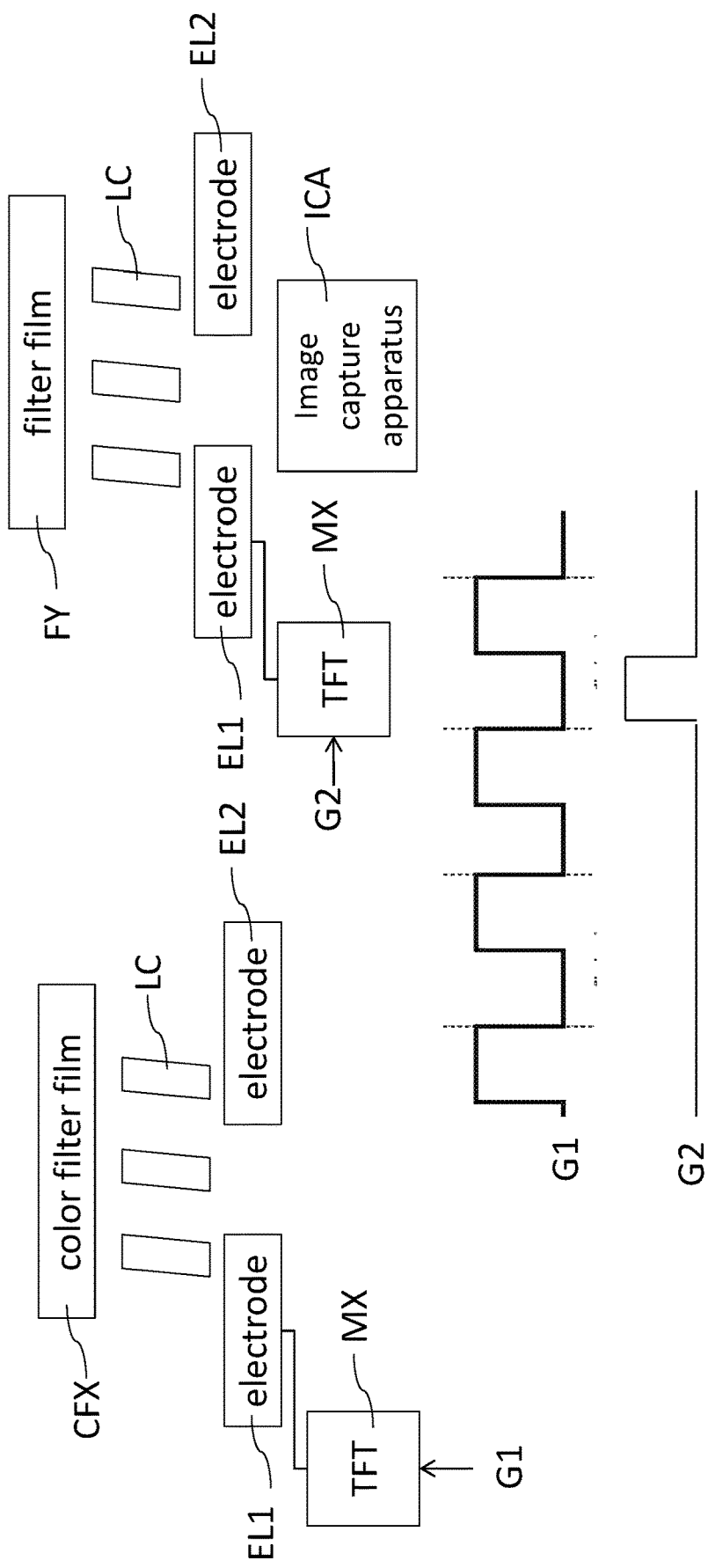
FIG. 28 is a schematic diagram showing scan signals of liquid crystal driving of the in-cell display apparatus associated with FIG. 27.

FIG. 28 is a schematic diagram showing scan signals of liquid crystal driving of the in-cell display apparatus associated with FIG. 27. As mentioned above, the additionally set transistors MX in the TFT layer LL4 are used to control the capturing of the biometrics image. The gate control signals G1 and G2 for the transistors MX and the additionally set transistors MX are not the same one. The gate control signal G2 is logic high after the gate control signal G1 becomes logic high several times, and that is, after several frames are displayed (for example, 3 frames), the additionally set transistors MX are turned on to make the image capture apparatuses ICA capture the biometrics image.

Figure 29:
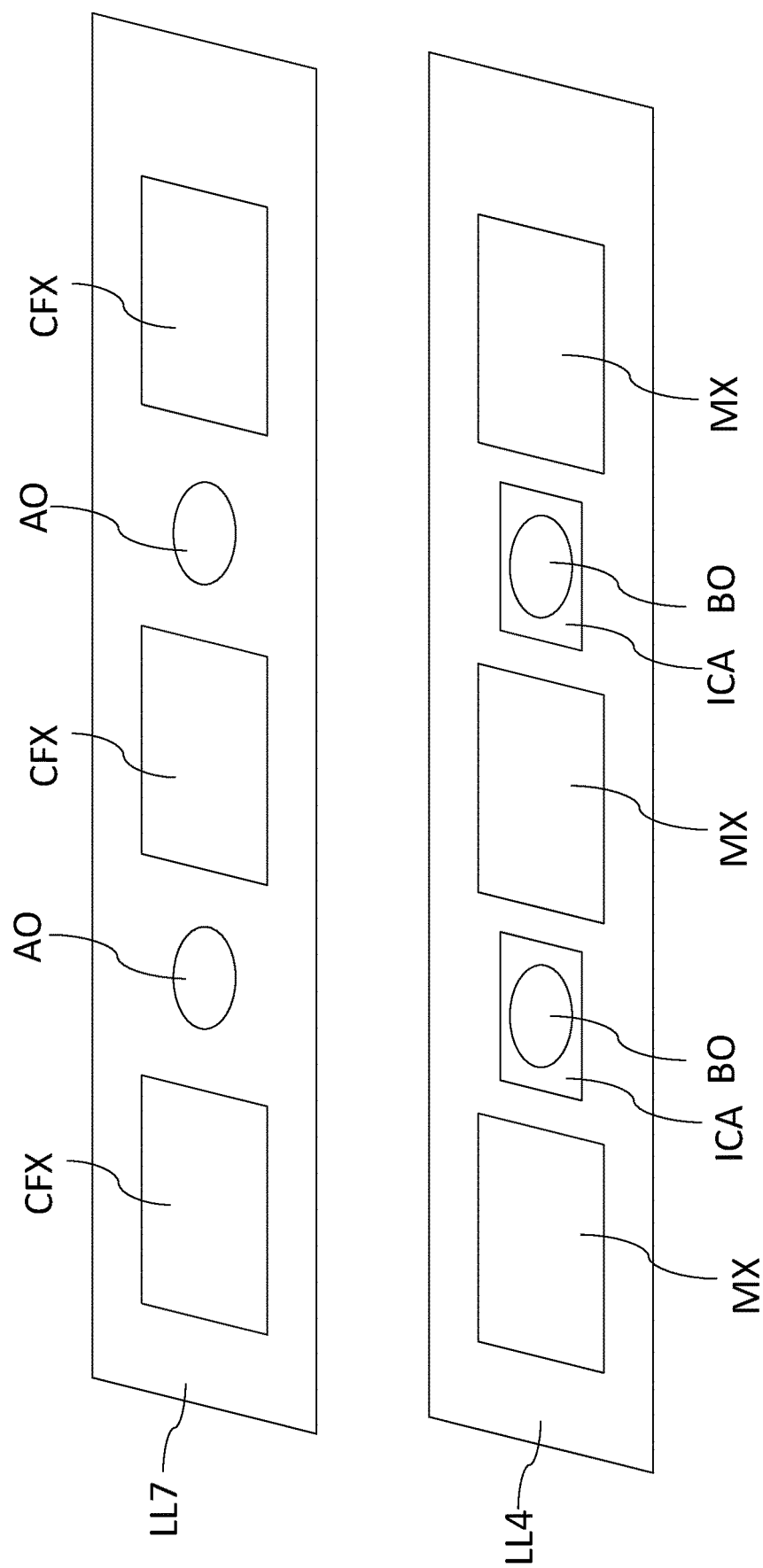
FIG. 29 is an explosive diagram showing a color filter layer and a thin film transistor layer of an in-cell display apparatus according to yet another embodiment of the present disclosure.

FIG. 29 is an explosive diagram showing a color filter layer and a thin film transistor layer of an in-cell display apparatus according to yet another embodiment of the present disclosure. In the embodiment, the vertical alignment manner of FIG. 22A is adopted, the transistor MX controls the rotation of its top liquid crystal, and there are aperture holes AO disposed between adjacent color filter films CFX of the color filter layer LL7 in the horizontal direction, and each of the aperture holes AO is disposed corresponding to one of the image capture apparatuses ICA of the TFT layer LL4 in the vertical direction. The image capture apparatus ICA has an aperture hole BO on its top surface to form a light blocking layer to allow the light beams reflected from the object pass the aperture hole BO, and the image capture apparatus ICA can further have the filter layer on its top surface. The light beams reflected from an object, such as a finger, can pass aperture holes AO, BO, and the image capture apparatuses ICA thus acquire the biometrics image.

By the way, without affecting the displayed image quality, the liquid crystals are controlled to allow the light beams reflected from an object pass at some specific time. Since the light beams reflected from an object, such as a finger, can not only pass color filter films CFX but also reflect to the image capture apparatuses ICA via liquid crystals, the image capture apparatuses ICA thus collects the light beams passing the aperture holes AO and the liquid crystal to acquire the biometrics image, which achieves the better image capturing quality.

Figure 30:
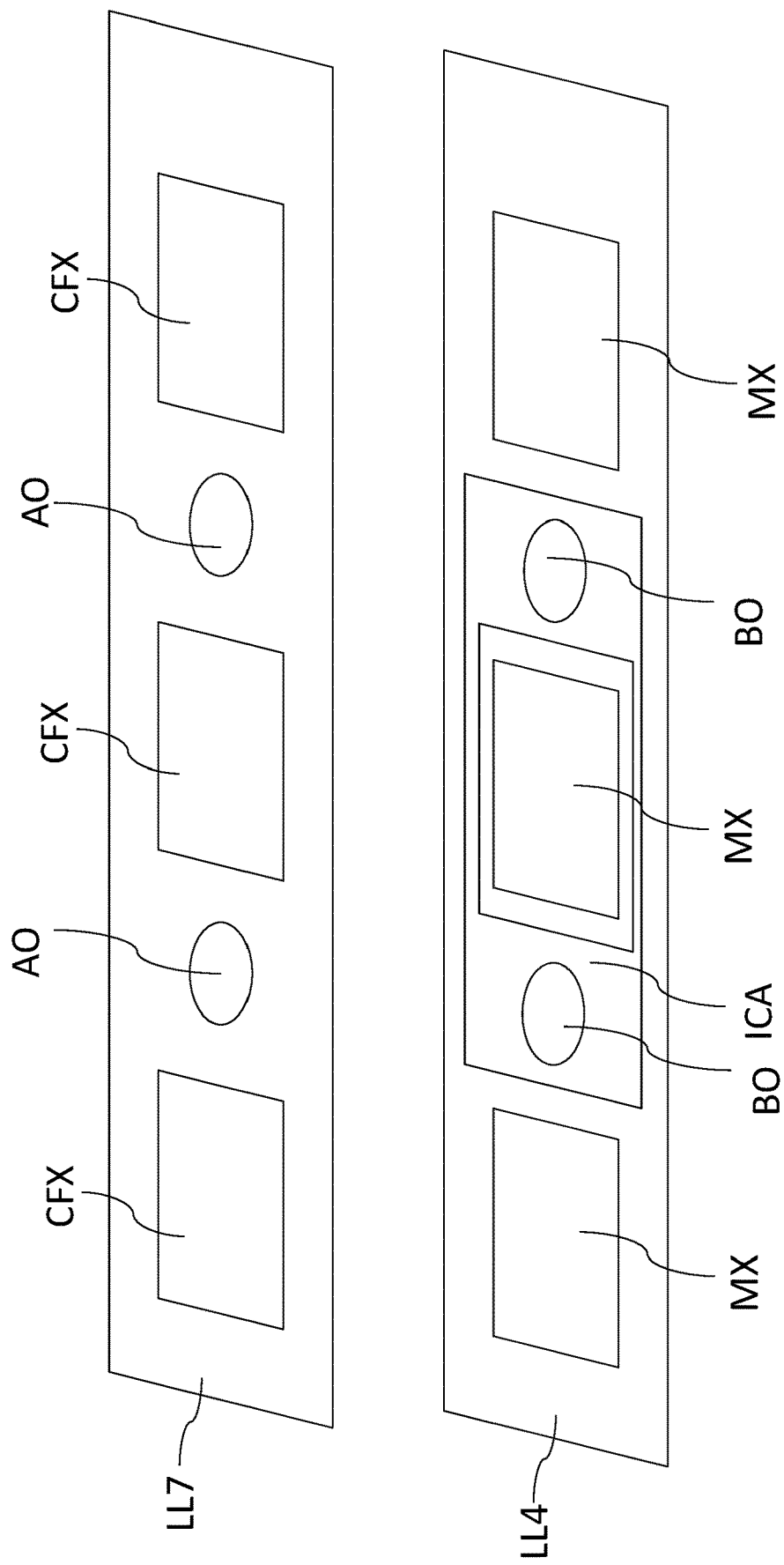
FIG. 30 is an explosive diagram showing a color filter layer and a thin film transistor layer of an in-cell display apparatus according to yet another embodiment of the present disclosure.

FIG. 30 is an explosive diagram showing a color filter layer and a thin film transistor layer of an in-cell display apparatus according to yet another embodiment of the present disclosure. In the embodiment, the vertical alignment manner of FIG. 22A is adopted, the transistor MX controls the rotation of its top liquid crystal, and there are aperture holes AO disposed between adjacent color filter films CFX of the color filter layer LL7 in the horizontal direction, and the aperture holes AO are disposed corresponding to one of the image capture apparatuses ICA of the TFT layer LL4 in the vertical direction. The image capture apparatus ICA has an aperture hole BO and can further have the filter layer. The light beams reflected from an object, such as a finger, can pass aperture holes AO, BO, and the image capture apparatuses ICA thus acquire the biometrics image.

Figure 31:
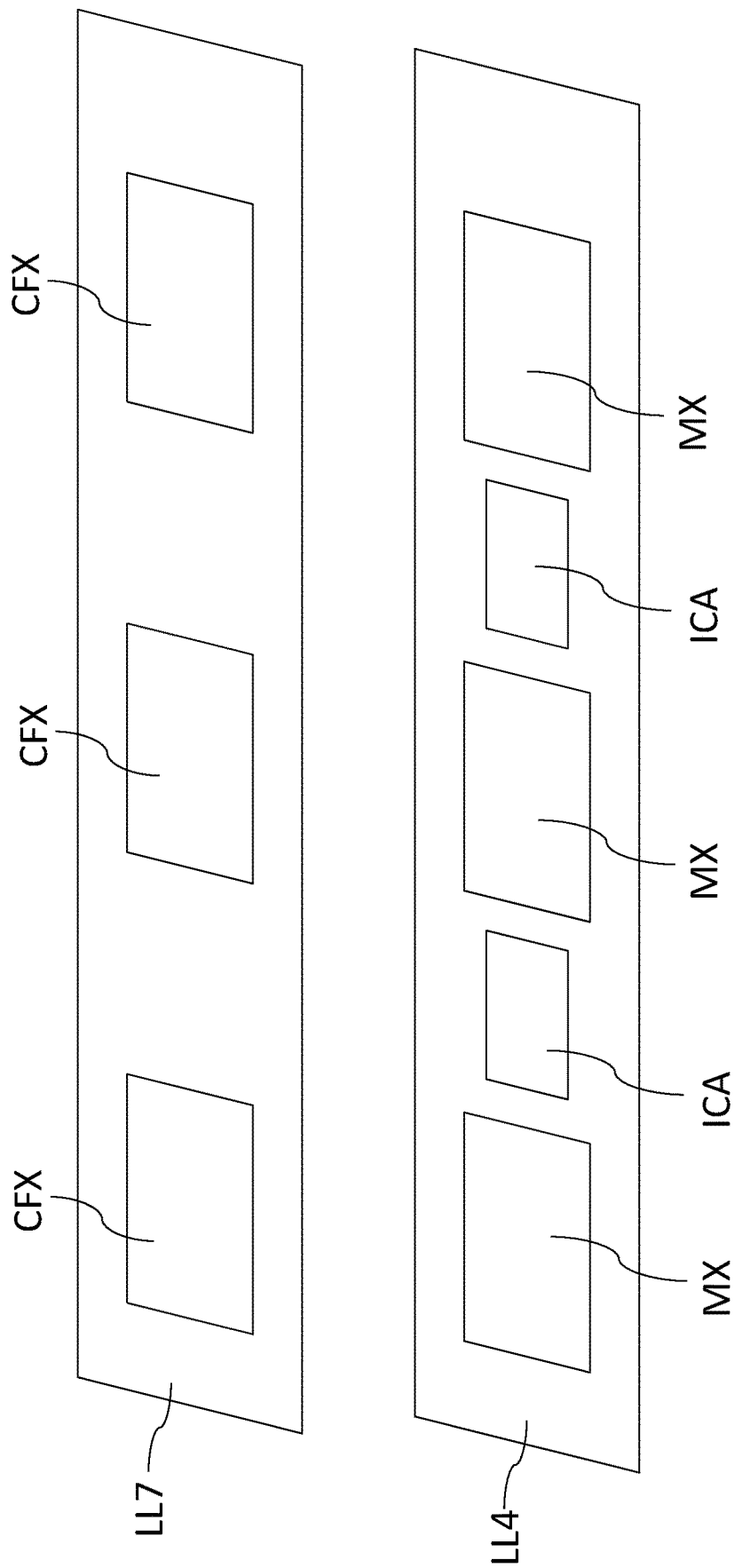
FIG. 31 is an explosive diagram showing a color filter layer and a thin film transistor layer of an in-cell display apparatus according to yet another embodiment of the present disclosure.

FIG. 31 is an explosive diagram showing a color filter layer and a thin film transistor layer of an in-cell display apparatus according to yet another embodiment of the present disclosure. In the embodiment, the vertical alignment manner of FIG. 22A is adopted, the transistor MX controls the rotation of its top liquid crystal, and there are no aperture holes AO disposed between adjacent color filter films CFX of the color filter layer LL7 in the horizontal direction, and each of the color filter films CFX is disposed corresponding to one of the transistors MX of the TFT layer LL4 in the vertical direction. The light beams reflected from an object, such as a finger, can pass color filter films CFX and reflect to the image capture apparatuses ICA, and the image capture apparatuses ICA thus acquire the biometrics image. It is noted that, without affecting the displayed image quality, the liquid crystal are controlled to allow the light beams reflected from an object pass at some specific time.

Figure 32:
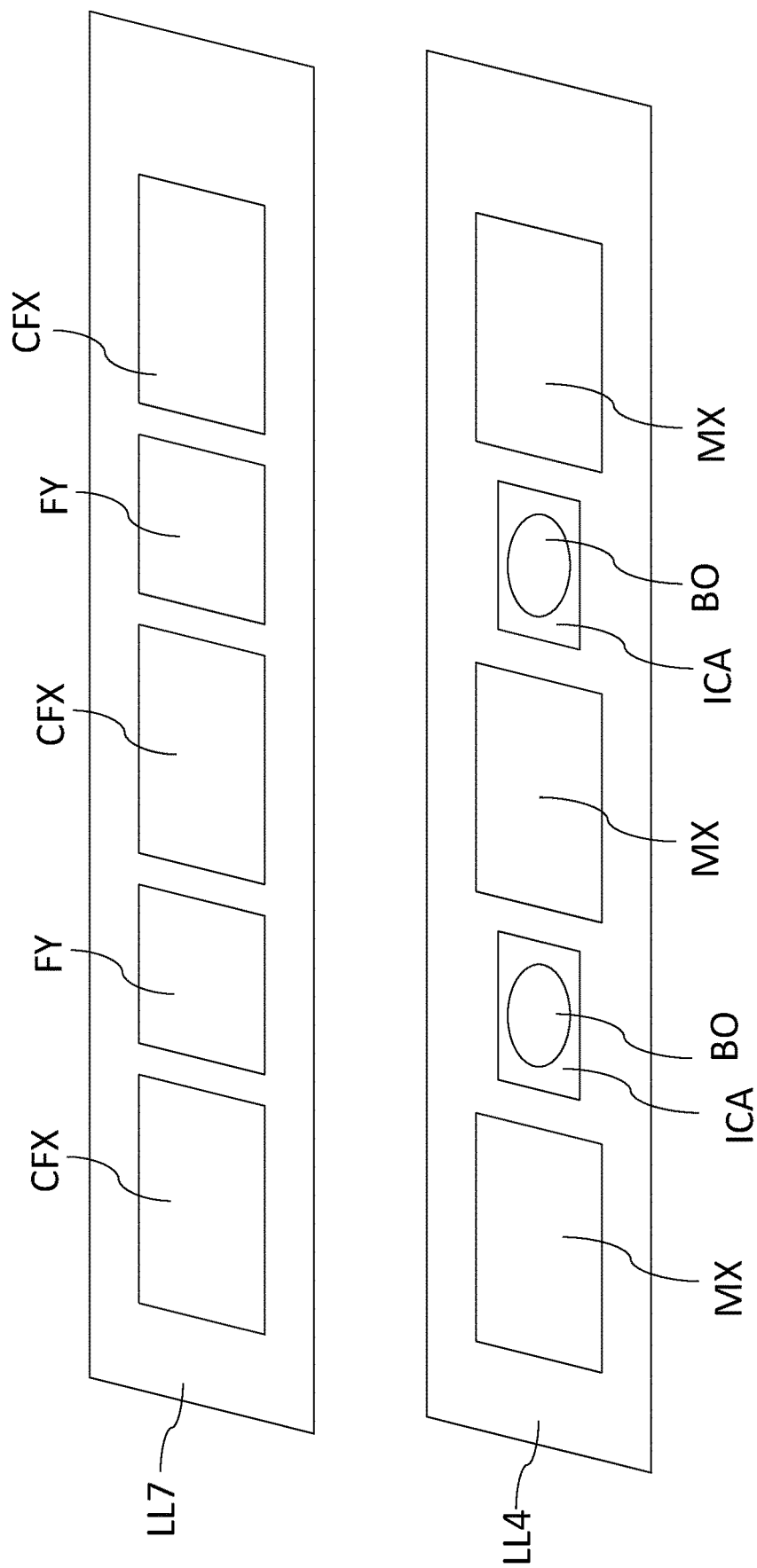
FIG. 32 is an explosive diagram showing a color filter layer and a thin film transistor layer of an in-cell display apparatus according to yet another embodiment of the present disclosure.

FIG. 32 is an explosive diagram showing a color filter layer and a thin film transistor layer of an in-cell display apparatus according to yet another embodiment of the present disclosure. In the embodiment, the vertical alignment manner of FIG. 22A is adopted, the transistor MX controls the rotation of its top liquid crystal, and there are white color, visual light or non-visual light (such as, infrared ray) films FY disposed between adjacent color filter films CFX of the color filter layer LL7 in the horizontal direction, and each of the white color, visual light or non-visual light films FY is disposed corresponding to one of the image capture apparatuses ICA of the TFT layer LL4 in the vertical direction. The image capture apparatus ICA has an aperture hole BO and can further has the filter layer. The light beams reflected from an object, such as a finger, can pass the white color, visual light or non-visual light films FY and the aperture holes BO, and the image capture apparatuses ICA thus acquire the biometrics image.

Figure 33:
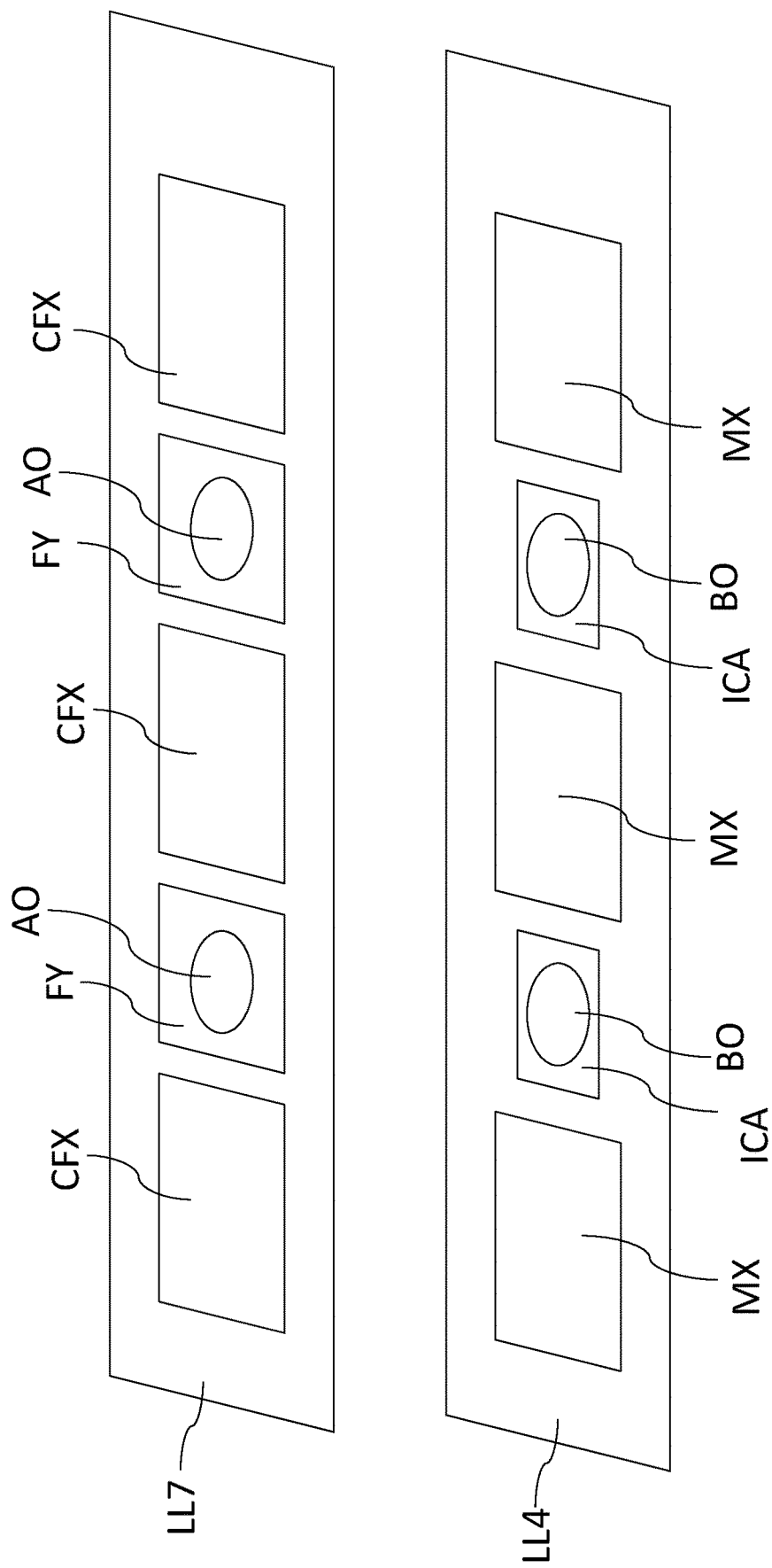
FIG. 33 is an explosive diagram showing a color filter layer and a thin film transistor layer of an in-cell display apparatus according to yet another embodiment of the present disclosure.

FIG. 33 is an explosive diagram showing a color filter layer and a thin film transistor layer of an in-cell display apparatus according to yet another embodiment of the present disclosure. Being different from the embodiment of FIG. 32, the white color, visual light or non-visual light films FY can have the aperture holes AO on its surface, so as to increase the collimation efficiency of the light beams.

In summary, the image capture apparatus of the present disclosure includes the image capture element and includes the spatial filter disposed on the image capture element. The spatial filter includes the translucent substrates and the light shielding structures that are alternately arranged. By using the light shielding structure, the light beam reflected by the finger may enter the pixel region on the image capture element in a more collimated manner so as to achieve good image capturing quality. In addition, even if an uncollimated light beam enters the opening so as to contact the surface of the reflective layer, the surrounding light absorbing layer may absorb the light beam immediately or the other reflective layer may reflect the light beam to decrease the cross-talk, thereby preventing the light beam from entering the adjacent opening to cause a cross-talk phenomenon and thus improving the accuracy of image capturing. Further, in the present disclosure, an in-cell display apparatus using the image capture apparatus is provided, which TFT layer can have the image capture apparatus as mentioned above, so as to have a thickness thinner than that of the conventional on-cell display apparatus.

Although the embodiments are already disclosed as above, these embodiments should not be construed as limitations on the scope of the present disclosure. It will be apparent to those skilled in the art that various modifications and variations can be made to the disclosed embodiments without departing from the scope or spirit of this present disclosure. In view of the foregoing, it is intended that the present disclosure covers modifications and variations provided that they fall within the scope of the following claims and their equivalents.

What is claimed is:

1. An image capture apparatus, comprising:
   an image capture element having a plurality of pixel regions; and
   an optical component layer, comprising a microstructure layer and a spatial filter formed on the image capture element in a first direction, wherein the microstructure layer has a plurality of micro lenses formed on a surface of the microstructure layer, and the spatial filter comprises:
   at least one translucent substrate; and
   at least one light shielding structure, the light shielding structures is formed in the translucent substrate, wherein the light shielding structure comprises a light absorbing/reflective layer and a reflective layer in the first direction stacked to each other;
   wherein the light absorbing/reflective layer has a plurality of first openings in a second direction perpendicular to the first direction, the reflective layer has a plurality of second openings in the second direction, each of the first openings is corresponding to one of the pixel regions, one of the second openings and one of the micro lenses in the first direction, wherein the light absorbing/reflective layer is another one light reflective layer or a light absorbing layer;

wherein a distance HC between the reflective layer and the light absorbing/reflective layer in the first direction satisfies "HC≤$\pi$((WM/2)$^2$+H$^2$)/2H", WM is a width or diameter of the micro lens in the second direction, H is a thickness of the micro lens MR in the first direction, and HC is larger than or equal to 0.

2. The image capture apparatus of claim 1, wherein the light absorbing/reflective layer is formed on or under the reflective layer, the first opening has a width W1 in the second direction, the second opening has a width W2 in the second direction, and the first opening and the second opening satisfy "W2≤W1".

3. The image capture apparatus of claim 1, wherein the first opening and the second opening satisfy "0.2W1≤W2≤0.8W1".

4. The image capture apparatus of claim 1, wherein the distance HC between the reflective layer and the light absorbing/reflective layer in the first direction satisfies "HC≤$\pi$((WM/2)$^2$+H$^2$)/4H".

5. The image capture apparatus of claim 1, wherein the reflective layer and the light absorbing/reflective layer are formed by one or combination of a deposition process, an etching process and photography process.

6. The image capture apparatus of claim 1, wherein the reflective layer and the light absorbing/reflective layer are adhered to each other.

7. The image capture apparatus of claim 1, further comprising:
a cover plate, formed on the microstructure layer; and
a surface plasma resonance layer, formed on the cover plate.

8. The image capture apparatus of claim 1, wherein the light absorbing/reflective layer is the light absorbing layer, the light absorbing layer is formed by a structure of light absorbing walls and yet another one reflective layer surrounded by the light absorbing walls in directions perpendicular to the first direction.

9. The image capture apparatus of claim 1, wherein the light absorbing/reflective layer is the other one reflective layer, and the light shielding structure further comprises at least one light absorbing wall formed on one edge side of the translucent substrate in the second direction.

10. The image capture apparatus of claim 1, the light absorbing/reflective layer is the other one reflective layer, and the light shielding structure further comprises a light absorbing layer formed between the two reflective layers in the first direction.

11. The image capture apparatus of claim 1, wherein an area of the first opening and an area of the second opening are less than a projection area of the micro lens and a sensing area of the pixel regions, and the sensing area of the pixel regions is larger than the projection area of the micro lens, wherein the sensing area of the pixel regions is an area formed by centers of the four adjacent pixel regions.

12. The image capture apparatus of claim 1, further comprising:
a first adhesion layer and a second adhesion layer; and
a frame, wherein bottom sides of the frame are adhered to top sides of the microstructure layer via the second adhesion layer, top sides of the frame are adhered to bottom sides of a cover plate via the first adhesion layer, and projection of the second adhesion layer on the cover plate falls within the projection of the frame on the cover plate.

13. An electronic apparatus, comprising:
a hardware circuit; and
at least one image capture apparatus, electrically connected to the hardware circuit and comprising:
an image capture element having a plurality of pixel regions; and
an optical component layer, comprising a microstructure layer and a spatial filter formed on the image capture element in a first direction, wherein the microstructure layer has a plurality of micro lenses formed on a surface of the microstructure layer, and the spatial filter comprises:
at least one translucent substrate; and
at least one light shielding structure, the light shielding structures is formed in the translucent substrate, wherein the light shielding structure comprises a light absorbing/reflective layer and a reflective layer in the first direction stacked to each other;
wherein the light absorbing/reflective layer has a plurality of first openings in a second direction perpendicular to the first direction, the reflective layer has a plurality of second openings in the second direction, each of the first openings is corresponding to one of the pixel regions, one of the second openings and one of the micro lenses in the first direction, wherein the light absorbing/reflective layer is another one light reflective layer or a light absorbing layer;
wherein a distance HC between the reflective layer and the light absorbing/reflective layer in the first direction satisfies "HC≤$\pi$((WM/2)$^2$+H$^2$)/2H", WM is a width or diameter of the micro lens in the second direction, H is a thickness of the micro lens MR in the first direction, and HC is larger than or equal to 0.

14. An in-cell display apparatus, comprising:
a plurality of image capture apparatuses comprised in a thin film transistor layer, and each of the image capture apparatuses comprising:
an image capture element having a plurality of pixel regions; and
an optical component layer, comprising a spatial filter disposed on the image capture element in a first direction, and the spatial filter comprises:
at least one translucent substrate; and
at least one light shielding structure, the light shielding structures is formed in the translucent substrate, wherein the light shielding structure comprises a light absorbing/reflective layer and a reflective layer in the first direction stacked to each other;
wherein the light absorbing/reflective layer is another one light reflective layer or a light absorbing layer.

15. The in-cell display apparatus of claim 14, further comprising:
a backlight module;
the thin film transistor layer, disposed on the backlight module;
a liquid crystal layer, disposed on the thin film transistor layer and having liquid crystals controlled by transistors of the thin film transistor layer; and
a color filter layer, having a plurality of color filter film disposed corresponding to the liquid crystals.

16. The in-cell display apparatus of claim 14, wherein the optical component layer further comprises a microstructure layer which has a plurality of micro lenses formed on a surface of the microstructure layer, wherein the light absorbing/reflective layer has a plurality of first openings in a second direction perpendicular to the first direction, the reflective layer has a plurality of second openings in the second direction, each of the first openings is corresponding to one of the pixel regions, one of the second openings and one of the micro lenses in the first direction.

17. The in-cell display apparatus of claim 14, wherein the color filter layer comprises aperture holes, and each of the aperture holes is formed between two adjacent color filter films of the color filter layer, and one or more aperture holes are disposed corresponding to one of the image capture apparatuses of the thin film transistor layer.

18. The in-cell display apparatus of claim 14, wherein the color filter layer comprises white color, visual light or non-visual light films, and each of the white color, visual light or non-visual light films is formed between two adjacent color filter films of the color filter layer and corresponding to one of the image capture apparatuses of the thin film transistor layer.

19. The in-cell display apparatus of claim 14, wherein each of the color films of the color filter layer are formed corresponding to the image capture apparatus which is disposed between the two adjacent transistors of the thin film transistor layer.

20. The in-cell display apparatus of claim 14, wherein the image capture apparatus comprises aperture hole from its top surface.

21. The in-cell display apparatus of claim 18, wherein each of the white color, visual light or non-visual light films comprises aperture hole from its top surface.

22. The in-cell display apparatus of claim 14, wherein the transistors which control the liquid crystals corresponding to the image capture apparatuses are turned on after several frames are displayed.

* * * * *